United States Patent
Dion

(10) Patent No.: US 11,304,075 B2
(45) Date of Patent: Apr. 12, 2022

(54) NETWORK PATH RELIABILITY

(71) Applicant: Nokia Solutions and Networks Oy, Espoo (FI)

(72) Inventor: Gino Dion, Quispamsis (CA)

(73) Assignee: Nokia Solutions and Networks Oy, Espoo (FI)

( * ) Notice: Subject to any disclaimer, the term of this patent is extended or adjusted under 35 U.S.C. 154(b) by 63 days.

(21) Appl. No.: 16/367,498

(22) Filed: Mar. 28, 2019

(65) Prior Publication Data
US 2020/0245162 A1   Jul. 30, 2020

Related U.S. Application Data

(60) Provisional application No. 62/807,199, filed on Feb. 18, 2019, provisional application No. 62/797,902, filed on Jan. 28, 2019.

(51) Int. Cl.
*H04W 24/04* (2009.01)
*H04L 12/28* (2006.01)
*H04L 41/0806* (2022.01)

(52) U.S. Cl.
CPC ......... *H04W 24/04* (2013.01); *H04L 12/2854* (2013.01); *H04L 41/0806* (2013.01)

(58) Field of Classification Search
CPC . H04W 24/04; H04L 12/2854; H04L 41/0806
See application file for complete search history.

(56) References Cited

U.S. PATENT DOCUMENTS

| | | | |
|---|---|---|---|
| 2008/0089235 A1* | 4/2008 | Kotrla | H04L 47/41 370/242 |
| 2015/0016260 A1* | 1/2015 | Chow | H04L 47/125 370/235 |
| 2016/0006631 A1* | 1/2016 | Qin | H04L 12/2885 398/10 |

(Continued)

FOREIGN PATENT DOCUMENTS

WO   WO 2018/203113 A1   11/2018

OTHER PUBLICATIONS

Extended European Search Report mailed in corresponding EP Application No. 20150334.9 dated May 11, 2020, 11 pages.

(Continued)

*Primary Examiner* — Kodzovi Acolatse
(74) *Attorney, Agent, or Firm* — Tong, Rea, Bentley & Kim, LLC

(57) ABSTRACT

Various example embodiments for supporting network path reliability are presented. Various example embodiments for supporting network path reliability may be configured to support network path reliability for a set of network paths of an end user. Various example embodiments for supporting network path reliability may be configured to support network path reliability for a set of network paths associated to form a single logical connection for an end user based on use of hybrid access technology and multipath technology. In at least some example embodiments, support for network path reliability may include supporting one or more network path testing types (e.g., network path reachability testing, network path performance testing, or the like, as well as various combinations thereof) in hybrid access based on multipath technology.

24 Claims, 7 Drawing Sheets

(56) References Cited

U.S. PATENT DOCUMENTS

| | | | |
|---|---|---|---|
| 2016/0127150 A1* | 5/2016 | Qian | H04L 45/24 |
| | | | 370/477 |
| 2016/0212755 A1* | 7/2016 | Cao | H04W 40/12 |
| 2017/0005830 A1* | 1/2017 | Zhang | H04L 12/4633 |
| 2018/0205660 A1 | 7/2018 | Hang et al. | |
| 2018/0248763 A1* | 8/2018 | He | H04L 41/12 |
| 2019/0045562 A1* | 2/2019 | Liu | H04W 76/22 |
| 2019/0182363 A1* | 6/2019 | Bonaventure | H04L 69/14 |
| 2020/0092400 A1* | 3/2020 | Bonaventure | H04W 40/22 |
| 2020/0288212 A1* | 9/2020 | Alvarez Dominguez | |
| | | | H04N 21/2347 |
| 2021/0084523 A1* | 3/2021 | Kucera | H04W 28/06 |

OTHER PUBLICATIONS

Postel, J., "Echo Protocol," Network Working Group, RFC 862, May 1983, 1 page.
Constantine, B., et al., "Framework for TCP Throughput Testing," Internet Engineering Task Force (IETF), RFC 6349, Aug. 2011, 27 pages.
Broadband Forum Technical Report, "Enabling Network Throughput Performance Tests and Statistical Monitoring", TR-143, Issue: 1, Amendment 1, Corrigendum 1, Aug. 2015. 44 pages.

\* cited by examiner

NETWORK PATH RELIABILITY

CROSS-REFERENCE TO RELATED APPLICATIONS

This application claims the benefit of U.S. Provisional Patent Application Ser. No. 62/797,902, filed on Jan. 28, 2019, and claims the benefit of U.S. Provisional Patent Application Ser. No. 62/807,199, filed on Feb. 18, 2019, each of which is hereby incorporated herein by reference.

TECHNICAL FIELD

Various example embodiments relate generally to communication systems and, more particularly but not exclusively, to network path reliability in communication systems.

BACKGROUND

While broadband access networks serving end users continually evolve to increase traffic speeds supported for end users, service providers also continue to search for other techniques to increase traffic speeds supported for the end users. For example, one technique to increase the traffic speed supported for an end user is to apply a combination of hybrid access and multipath technology (e.g., Multipath Transmission Control Protocol (MPTCP)) to aggregate multiple access network paths available to the end user into a single logical connection for the end user.

SUMMARY

In at least some example embodiments, an apparatus includes at least one processor and at least one memory including program code, wherein the at least one memory and the program code are configured to, with the at least one processor, cause the apparatus to at least determine, by a hybrid-access customer premises equipment (HCPE) supporting a set of wide area network (WAN) interfaces based on respective evaluations performed for the respective WAN interfaces, respective reliability statuses of the respective WAN interfaces and control, by the HCPE based on the respective reliability statuses of the respective WAN interfaces, a multipath interface group for a multipath connection of the HCPE. In at least some example embodiments, the reliability statuses for the respective WAN interfaces are assigned based on a set of reliability status values supported by the HCPE. In at least some example embodiments, the set of reliability status values supported by the HCPE includes a first value indicative that the WAN interface is up and operational, a second value indicative that the WAN interface is up, is operating correctly, has been tested, and is included in the multipath interface group, a third value indicative that the WAN interface is included in the multipath interface group, but is experiencing degraded service, a fourth value indicative that the WAN interface is up, but that, due to a failure, has been removed from the multipath interface group, and a fifth value indicative that the WAN interface is down, unavailable, or unreachable. In at least some example embodiments, the respective reliability statuses of the WAN interfaces are determined based on boot-up of the HCPE. In at least some example embodiments, based on a determination that a respective WAN interface of the set of WAN interfaces is a wired interface, the respective evaluation performed for the respective WAN interface includes a determination of a link status of a link associated with the respective WAN interface. In at least some example embodiments, based on a determination that the link status of the link associated with the respective WAN interface is indicative that the link is up, the reliability status is set to a value indicative that the WAN interface is up and operational. In at least some example embodiments, the at least one memory and the program code are configured to, with the at least one processor, cause the apparatus to at least initiate, by the HCPE, lower stack Internet Protocol (IP) configurations at the HCPE. In at least some example embodiments, based on a determination that the link status of the link associated with the respective WAN interface is indicative that the link is down, the reliability status is set to a value indicative that the respective WAN interface is down, unavailable, or unreachable. In at least some example embodiments, the at least one memory and the program code are configured to, with the at least one processor, cause the apparatus to at least prevent, by the HCPE, inclusion of the respective WAN interface in the multipath interface group for the multipath connection of the HCPE. In at least some example embodiments, the at least one memory and the program code are configured to, with the at least one processor, cause the apparatus to at least detect, by the HCPE, that the link associated with the respective WAN interface has switched from being down to being up and initiate, by the HCPE after a wait time, readiness testing for the respective WAN interface. In at least some example embodiments, based on a determination that a respective WAN interface of the set of WAN interfaces is a wireless interface, the respective evaluation performed for the respective WAN interface includes a set of verification checks. In at least some example embodiments, the set of verification checks includes at least one of a check for verifying subscriber identification module (SIM) card readiness, a check for verifying network status, or a check for verifying packet data network (PDN) connection status. In at least some example embodiments, based on a determination that each of the verification checks associated with the respective WAN interface is successful, the reliability status is set to a value indicative that the WAN interface is up and operational. In at least some example embodiments, the at least one memory and the program code are configured to, with the at least one processor, cause the apparatus to at least initiate, by the HCPE, lower stack Internet Protocol (IP) configurations at the HCPE. In at least some example embodiments, based on a determination that at least one of the verification checks associated with the respective WAN interface is unsuccessful, the reliability status is set to a value indicative that that the WAN interface is down, unavailable, or unreachable. In at least some example embodiments, the at least one memory and the program code are configured to, with the at least one processor, cause the apparatus to at least prevent, by the HCPE, inclusion of the respective WAN interface in the multipath interface group for the multipath connection of the HCPE. In at least some example embodiments, the at least one memory and the program code are configured to, with the at least one processor, cause the apparatus to at least periodically re-execute the set of verification checks for the respective WAN interface until each of the verification checks in the set of verification checks is successful. In at least some example embodiments, to control the multipath interface group for the multipath connection of the HCPE, the at least one memory and the program code are configured to, with the at least one processor, cause the apparatus to at least control, based on the respective reliability statuses of the respective WAN interfaces, a membership of the multipath interface group for the multipath connection. In at least some example embodiments, for a respective WAN interface of the set of WAN interfaces, the respective evaluation performed for the respective WAN interface includes a path validation test configured to validate a network path associated with the respective WAN interface. In at least some example embodiments, to perform the path validation test, the at least one memory and the program code are configured to, with the at least one processor, cause the apparatus to at least send, by the HCPE, a set of path validation messages via the respective WAN interface and determine, by the HCPE based on the set of path validation messages, the respective reliability status for the respective WAN interface. In at least some example embodiments, the path validation messages are sent to a server cluster downstream of a hybrid access gateway (HAG) serving the HCPE. In at least some example embodiments, the path validation messages comprise respective ping messages. In at least some example embodiments, to determine the respective reliability status for the respective WAN interface based on the set of path validation messages, the at least one memory and the program code are configured to, with the at least one processor, cause the apparatus to at least set, based on a determination that a threshold number of the path validation messages are successfully received, the reliability status of the respective WAN interface to a value indicative that the respective WAN interface is up, is operating correctly, has been tested, and is included in the multipath interface group. In at least some example embodiments, the at least one memory and the program code are configured to, with the at least one processor, cause the apparatus to at least send, by the HCPE, a path performance metrics message configured to support collection by the HCPE of path performance metrics for the respective network path associated with the respective WAN interface. In at least some example embodiments, to determine the respective reliability status for the respective WAN interface based on the set of path validation messages, the at least one memory and the program code are configured to, with the at least one processor, cause the apparatus to at least keep, by the HCPE based on a determination that a threshold number of the path validation messages are not successfully received, the reliability status of the respective WAN interface set to a value indicative that the respective WAN interface is up and operational. In at least some example embodiments, the at least one memory and the program code are configured to, with the at least one processor, cause the apparatus to at least initiate, by the HCPE based on a determination that the respective path validation tests performed for the respective WAN interfaces are successful, activation of the multipath interface group. In at least some example embodiments, the at least one memory and the program code are configured to, with the at least one processor, cause the apparatus to at least initiate, by the HCPE, activation of the multipath interface group based on a determination that, for each of the WAN interfaces, the respective reliability status of the respective WAN interface is set to a value indicative that the respective WAN interface is up, is operating correctly, has been tested, and is included in the multipath interface group. In at least some example embodiments, the at least one memory and the program code are configured to, with the at least one processor, cause the apparatus to at least initiate, by the HCPE, activation of the multipath interface group and initiate, by the HCPE based on a multipath protocol of the multipath connection, a Hypertext Transfer Protocol (HTTP) speed test for the multipath connection. In at least some example embodiments, to control the multipath interface group for the multipath connection of the HCPE, the at least one memory and the program code are configured to, with the at least one processor, cause the apparatus to at least control, based on the respective reliability statuses of the respective WAN interfaces, establishment of the multipath interface group for the multipath connection. In at least some example embodiments, for a respective WAN interface of the set of WAN interfaces, the respective evaluation performed for the respective WAN interface includes a path monitoring test configured to monitor operation of a network path associated with the respective WAN interface. In at least some example embodiments, to perform the path monitoring test, the at least one memory and the program code are configured to, with the at least one processor, cause the apparatus to at least send, by the HCPE, a set of path validation messages via the respective WAN interface and determine, by the HCPE based on the set of path validation messages, the respective reliability status for the respective WAN interface. In at least some example embodiments, the path validation messages are sent to a server cluster downstream of a hybrid access gateway (HAG) serving the HCPE. In at least some example embodiments, the path validation messages comprise respective ping messages. In at least some example embodiments, to perform the path monitoring test, the at least one memory and the program code are configured to, with the at least one processor, cause the apparatus to at least send, by the HCPE via the respective WAN interface periodically according to an initial test schedule, path validation messages and monitor, by the HCPE, for respective path validation responses to the respective path validation messages. In at least some example embodiments, the at least one memory and the program code are configured to, with the at least one processor, cause the apparatus to at least activate, by the HCPE based on a determination that one of the path validation responses is not received, use of a second test schedule for the respective WAN interface, send, by the HCPE via the respective WAN interface periodically according to the second test schedule, a set of path validation messages, and monitor, by the HCPE, for a set of path validation responses for the set of path validation messages. In at least some example embodiments, the at least one memory and the program code are configured to, with the at least one processor, cause the apparatus to at least activate, by the HCPE based on a determination that a threshold number of the path validation responses are received, use of the initial test schedule for the respective WAN interface. In at least some example embodiments, the at least one memory and the program code are configured to, with the at least one processor, cause the apparatus to at least set, by the HCPE based on a determination that a threshold number of the path validation responses are not received, the reliability status of the respective WAN interface to a value indicative that the respective WAN interface is included in the multipath interface group, but is experiencing degraded service and initiate, by the HCPE, an alarm related to reliability of the respective WAN interface. In at least some example embodiments, the at least one memory and the program code are configured to, with the at least one processor, cause the apparatus to at least determine, by the HCPE based on a determination that a threshold number of the path validation responses are not received, whether the respective WAN interface is a default WAN interface for the multipath interface group and determine, by the HCPE based on whether the respective WAN interface is the default WAN interface for the multipath interface group, the respective reliability status for the respective WAN interface. In at least some example embodiments, the at least one memory and the program code are configured to, with the at least one processor, cause the apparatus to at least set, by the HCPE based on a determination that the respective WAN interface is not the default WAN interface for the multipath interface group, the reliability status of the respective WAN interface to a value indicative that the WAN interface is up, but that, due to a failure, has been removed from the multipath interface group and initiate, by the HCPE, an alarm related to reliability of the respective WAN interface. In at least some example embodiments, the at least one memory and the program code are configured to, with the at least one processor, cause the apparatus to at least set, by the HCPE based on a determination that the respective WAN interface is the default WAN interface for the multipath interface group, the reliability status of the respective WAN interface to a value indicative that the WAN interface is down, unavailable, or unreachable and initiate, by the HCPE, an alarm related to reliability of the respective WAN interface. In at least some example embodiments, to control the multipath interface group for the multipath connection of the HCPE, the at least one memory and the program code are configured to, with the at least one processor, cause the apparatus to at least control, based on the respective reliability statuses of the respective WAN interfaces, maintenance of the multipath interface group for the multipath connection.

In at least some example embodiments, a non-transitory computer-readable medium includes instructions configured to cause an apparatus to at least determine, by a hybrid-access customer premises equipment (HCPE) supporting a set of wide area network (WAN) interfaces based on respective evaluations performed for the respective WAN interfaces, respective reliability statuses of the respective WAN interfaces and control, by the HCPE based on the respective reliability statuses of the respective WAN interfaces, a multipath interface group for a multipath connection of the HCPE. In at least some example embodiments, the reliability statuses for the respective WAN interfaces are assigned based on a set of reliability status values supported by the HCPE. In at least some example embodiments, the set of reliability status values supported by the HCPE includes a first value indicative that the WAN interface is up and operational, a second value indicative that the WAN interface is up, is operating correctly, has been tested, and is included in the multipath interface group, a third value indicative that the WAN interface is included in the multipath interface group, but is experiencing degraded service, a fourth value indicative that the WAN interface is up, but that, due to a failure, has been removed from the multipath interface group, and a fifth value indicative that the WAN interface is down, unavailable, or unreachable. In at least some example embodiments, the respective reliability statuses of the WAN interfaces are determined based on boot-up of the HCPE. In at least some example embodiments, based on a determination that a respective WAN interface of the set of WAN interfaces is a wired interface, the respective evaluation performed for the respective WAN interface includes a determination of a link status of a link associated with the respective WAN interface. In at least some example embodiments, based on a determination that the link status of the link associated with the respective WAN interface is indicative that the link is up, the reliability status is set to a value indicative that the WAN interface is up and operational. In at least some example embodiments, the non-transitory computer-readable medium includes instructions configured to cause the apparatus to at least initiate, by the HCPE, lower stack Internet Protocol (IP) configurations at the HCPE. In at least some example embodiments, based on a determination that the link status of the link associated with the respective WAN interface is indicative that the link is down, the reliability status is set to a value indicative that the respective WAN interface is down, unavailable, or unreachable. In at least some example embodiments, the non-transitory computer-readable medium includes instructions configured to cause the apparatus to at least prevent, by the HCPE, inclusion of the respective WAN interface in the multipath interface group for the multipath connection of the HCPE. In at least some example embodiments, the non-transitory computer-readable medium includes instructions configured to cause the apparatus to at least detect, by the HCPE, that the link associated with the respective WAN interface has switched from being down to being up and initiate, by the HCPE after a wait time, readiness testing for the respective WAN interface. In at least some example embodiments, based on a determination that a respective WAN interface of the set of WAN interfaces is a wireless interface, the respective evaluation performed for the respective WAN interface includes a set of verification checks. In at least some example embodiments, the set of verification checks includes at least one of a check for verifying subscriber identification module (SIM) card readiness, a check for verifying network status, or a check for verifying packet data network (PDN) connection status. In at least some example embodiments, based on a determination that each of the verification checks associated with the respective WAN interface is successful, the reliability status is set to a value indicative that the WAN interface is up and operational. In at least some example embodiments, the non-transitory computer-readable medium includes instructions configured to cause the apparatus to at least initiate, by the HCPE, lower stack Internet Protocol (IP) configurations at the HCPE. In at least some example embodiments, based on a determination that at least one of the verification checks associated with the respective WAN interface is unsuccessful, the reliability status is set to a value indicative that that the WAN interface is down, unavailable, or unreachable. In at least some example embodiments, the non-transitory computer-readable medium includes instructions configured to cause the apparatus to at least prevent, by the HCPE, inclusion of the respective WAN interface in the multipath interface group for the multipath connection of the HCPE. In at least some example embodiments, the non-transitory computer-readable medium includes instructions configured to cause the apparatus to at least periodically re-execute the set of verification checks for the respective WAN interface until each of the verification checks in the set of verification checks is successful. In at least some example embodiments, to control the multipath interface group for the multipath connection of the HCPE, the non-transitory computer-readable medium includes instructions configured to cause the apparatus to at least control, based on the respective reliability statuses of the respective WAN interfaces, a membership of the multipath interface group for the multipath connection. In at least some example embodiments, for a respective WAN interface of the set of WAN interfaces, the respective evaluation performed for the respective WAN interface includes a path validation test configured to validate a network path associated with the respective WAN interface. In at least some example embodiments, to perform the path validation test, the non-transitory computer-readable medium includes instructions configured to cause the apparatus to at least send, by the HCPE, a set of path validation messages via the respective WAN interface and determine, by the HCPE based on the set of path validation messages, the respective reliability status for the respective WAN interface. In at least some example embodiments, the path validation messages are sent to a server cluster downstream of a hybrid access gateway (HAG) serving the HCPE. In at least some example embodiments, the path validation messages comprise respective ping messages. In at least some example embodiments, to determine the respective reliability status for the respective WAN interface based on the set of path validation messages, the non-transitory computer-readable medium includes instructions configured to cause the apparatus to at least set, based on a determination that a threshold number of the path validation messages are successfully received, the reliability status of the respective WAN interface to a value indicative that the respective WAN interface is up, is operating correctly, has been tested, and is included in the multipath interface group. In at least some example embodiments, the non-transitory computer-readable medium includes instructions configured to cause the apparatus to at least send, by the HCPE, a path performance metrics message configured to support collection by the HCPE of path performance metrics for the respective network path associated with the respective WAN interface. In at least some example embodiments, to determine the respective reliability status for the respective WAN interface based on the set of path validation messages, the non-transitory computer-readable medium includes instructions configured to cause the apparatus to at least keep, by the HCPE based on a determination that a threshold number of the path validation messages are not successfully received, the reliability status of the respective WAN interface set to a value indicative that the respective WAN interface is up and operational. In at least some example embodiments, the non-transitory computer-readable medium includes instructions configured to cause the apparatus to at least initiate, by the HCPE based on a determination that the respective path validation tests performed for the respective WAN interfaces are successful, activation of the multipath interface group. In at least some example embodiments, the non-transitory computer-readable medium includes instructions configured to cause the apparatus to at least initiate, by the HCPE, activation of the multipath interface group based on a determination that, for each of the WAN interfaces, the respective reliability status of the respective WAN interface is set to a value indicative that the respective WAN interface is up, is operating correctly, has been tested, and is included in the multipath interface group. In at least some example embodiments, the non-transitory computer-readable medium includes instructions configured to cause the apparatus to at least initiate, by the HCPE, activation of the multipath interface group and initiate, by the HCPE based on a multipath protocol of the multipath connection, a Hypertext Transfer Protocol (HTTP) speed test for the multipath connection. In at least some example embodiments, to control the multipath interface group for the multipath connection of the HCPE, the non-transitory computer-readable medium includes instructions configured to cause the apparatus to at least control, based on the respective reliability statuses of the respective WAN interfaces, establishment of the multipath interface group for the multipath connection. In at least some example embodiments, for a respective WAN interface of the set of WAN interfaces, the respective evaluation performed for the respective WAN interface includes a path monitoring test configured to monitor operation of a network path associated with the respective WAN interface. In at least some example embodiments, to perform the path monitoring test, the non-transitory computer-readable medium includes instructions configured to cause the apparatus to at least send, by the HCPE, a set of path validation messages via the respective WAN interface and determine, by the HCPE based on the set of path validation messages, the respective reliability status for the respective WAN interface. In at least some example embodiments, the path validation messages are sent to a server cluster downstream of a hybrid access gateway (HAG) serving the HCPE. In at least some example embodiments, the path validation messages comprise respective ping messages. In at least some example embodiments, to perform the path monitoring test, the non-transitory computer-readable medium includes instructions configured to cause the apparatus to at least send, by the HCPE via the respective WAN interface periodically according to an initial test schedule, path validation messages and monitor, by the HCPE, for respective path validation responses to the respective path validation messages. In at least some example embodiments, the non-transitory computer-readable medium includes instructions configured to cause the apparatus to at least activate, by the HCPE based on a determination that one of the path validation responses is not received, use of a second test schedule for the respective WAN interface, send, by the HCPE via the respective WAN interface periodically according to the second test schedule, a set of path validation messages, and monitor, by the HCPE, for a set of path validation responses for the set of path validation messages. In at least some example embodiments, the non-transitory computer-readable medium includes instructions configured to cause the apparatus to at least activate, by the HCPE based on a determination that a threshold number of the path validation responses are received, use of the initial test schedule for the respective WAN interface. In at least some example embodiments, the non-transitory computer-readable medium includes instructions configured to cause the apparatus to at least set, by the HCPE based on a determination that a threshold number of the path validation responses are not received, the reliability status of the respective WAN interface to a value indicative that the respective WAN interface is included in the multipath interface group, but is experiencing degraded service and initiate, by the HCPE, an alarm related to reliability of the respective WAN interface. In at least some example embodiments, the non-transitory computer-readable medium includes instructions configured to cause the apparatus to at least determine, by the HCPE based on a determination that a threshold number of the path validation responses are not received, whether the respective WAN interface is a default WAN interface for the multipath interface group and determine, by the HCPE based on whether the respective WAN interface is the default WAN interface for the multipath interface group, the respective reliability status for the respective WAN interface. In at least some example embodiments, the non-transitory computer-readable medium includes instructions configured to cause the apparatus to at least set, by the HCPE based on a determination that the respective WAN interface is not the default WAN interface for the multipath interface group, the reliability status of the respective WAN interface to a value indicative that the WAN interface is up, but that, due to a failure, has been removed from the multipath interface group and initiate, by the HCPE, an alarm related to reliability of the respective WAN interface. In at least some example embodiments, the non-transitory computer-readable medium includes instructions configured to cause the apparatus to at least set, by the HCPE based on a determination that the respective WAN interface is the default WAN interface for the multipath interface group, the reliability status of the respective WAN interface to a value indicative that the WAN interface is down, unavailable, or unreachable and initiate, by the HCPE, an alarm related to reliability of the respective WAN interface. In at least some example embodiments, to control the multipath interface group for the multipath connection of the HCPE, the non-transitory computer-readable medium includes instructions configured to cause the apparatus to at least control, based on the respective reliability statuses of the respective WAN interfaces, maintenance of the multipath interface group for the multipath connection.

In at least some example embodiments, a method includes determining, by a hybrid-access customer premises equipment (HCPE) supporting a set of wide area network (WAN) interfaces based on respective evaluations performed for the respective WAN interfaces, respective reliability statuses of the respective WAN interfaces and controlling, by the HCPE based on the respective reliability statuses of the respective WAN interfaces, a multipath interface group for a multipath connection of the HCPE. In at least some example embodiments, the reliability statuses for the respective WAN interfaces are assigned based on a set of reliability status values supported by the HCPE. In at least some example embodiments, the set of reliability status values supported by the HCPE includes a first value indicative that the WAN interface is up and operational, a second value indicative that the WAN interface is up, is operating correctly, has been tested, and is included in the multipath interface group, a third value indicative that the WAN interface is included in the multipath interface group, but is experiencing degraded service, a fourth value indicative that the WAN interface is up, but that, due to a failure, has been removed from the multipath interface group, and a fifth value indicative that the WAN interface is down, unavailable, or unreachable. In at least some example embodiments, the respective reliability statuses of the WAN interfaces are determined based on boot-up of the HCPE. In at least some example embodiments, based on a determination that a respective WAN interface of the set of WAN interfaces is a wired interface, the respective evaluation performed for the respective WAN interface includes a determination of a link status of a link associated with the respective WAN interface. In at least some example embodiments, based on a determination that the link status of the link associated with the respective WAN interface is indicative that the link is up, the reliability status is set to a value indicative that the WAN interface is up and operational. In at least some example embodiments, the method includes initiating, by the HCPE, lower stack Internet Protocol (IP) configurations at the HCPE. In at least some example embodiments, based on a determination that the link status of the link associated with the respective WAN interface is indicative that the link is down, the reliability status is set to a value indicative that the respective WAN interface is down, unavailable, or unreachable. In at least some example embodiments, the method includes preventing, by the HCPE, inclusion of the respective WAN interface in the multipath interface group for the multipath connection of the HCPE. In at least some example embodiments, the method includes detecting, by the HCPE, that the link associated with the respective WAN interface has switched from being down to being up and initiating, by the HCPE after a wait time, readiness testing for the respective WAN interface. In at least some example embodiments, based on a determination that a respective WAN interface of the set of WAN interfaces is a wireless interface, the respective evaluation performed for the respective WAN interface includes a set of verification checks. In at least some example embodiments, the set of verification checks includes at least one of a check for verifying subscriber identification module (SIM) card readiness, a check for verifying network status, or a check for verifying packet data network (PDN) connection status. In at least some example embodiments, based on a determination that each of the verification checks associated with the respective WAN interface is successful, the reliability status is set to a value indicative that the WAN interface is up and operational. In at least some example embodiments, the method includes initiating, by the HCPE, lower stack Internet Protocol (IP) configurations at the HCPE. In at least some example embodiments, based on a determination that at least one of the verification checks associated with the respective WAN interface is unsuccessful, the reliability status is set to a value indicative that that the WAN interface is down, unavailable, or unreachable. In at least some example embodiments, the method includes preventing, by the HCPE, inclusion of the respective WAN interface in the multipath interface group for the multipath connection of the HCPE. In at least some example embodiments, the method includes periodically re-executing the set of verification checks for the respective WAN interface until each of the verification checks in the set of verification checks is successful. In at least some example embodiments, controlling the multipath interface group for the multipath connection of the HCPE includes controlling, based on the respective reliability statuses of the respective WAN interfaces, a membership of the multipath interface group for the multipath connection. In at least some example embodiments, for a respective WAN interface of the set of WAN interfaces, the respective evaluation performed for the respective WAN interface includes a path validation test configured to validate a network path associated with the respective WAN interface. In at least some example embodiments, performing the path validation test includes sending, by the HCPE, a set of path validation messages via the respective WAN interface and determining, by the HCPE based on the set of path validation messages, the respective reliability status for the respective WAN interface. In at least some example embodiments, the path validation messages are sent to a server cluster downstream of a hybrid access gateway (HAG) serving the HCPE. In at least some example embodiments, the path validation messages comprise respective ping messages. In at least some example embodiments, determining the respective reliability status for the respective WAN interface based on the set of path validation messages includes setting, based on a determination that a threshold number of the path validation messages are successfully received, the reliability status of the respective WAN interface to a value indicative that the respective WAN interface is up, is operating correctly, has been tested, and is included in the multipath interface group. In at least some example embodiments, the method includes sending, by the HCPE, a path performance metrics message configured to support collection by the HCPE of path performance metrics for the respective network path associated with the respective WAN interface. In at least some example embodiments, determining the respective reliability status for the respective WAN interface based on the set of path validation messages includes keeping, by the HCPE based on a determination that a threshold number of the path validation messages are not successfully received, the reliability status of the respective WAN interface set to a value indicative that the respective WAN interface is up and operational. In at least some example embodiments, the method includes initiating, by the HCPE based on a determination that the respective path validation tests performed for the respective WAN interfaces are successful, activation of the multipath interface group. In at least some example embodiments, the method includes initiating, by the HCPE, activation of the multipath interface group based on a determination that, for each of the WAN interfaces, the respective reliability status of the respective WAN interface is set to a value indicative that the respective WAN interface is up, is operating correctly, has been tested, and is included in the multipath interface group. In at least some example embodiments, the method includes initiating, by the HCPE, activation of the multipath interface group and initiating, by the HCPE based on a multipath protocol of the multipath connection, a Hypertext Transfer Protocol (HTTP) speed test for the multipath connection. In at least some example embodiments, controlling the multipath interface group for the multipath connection of the HCPE includes controlling, based on the respective reliability statuses of the respective WAN interfaces, establishment of the multipath interface group for the multipath connection. In at least some example embodiments, for a respective WAN interface of the set of WAN interfaces, the respective evaluation performed for the respective WAN interface includes a path monitoring test configured to monitor operation of a network path associated with the respective WAN interface. In at least some example embodiments, performing the path monitoring test includes sending, by the HCPE, a set of path validation messages via the respective WAN interface and determining, by the HCPE based on the set of path validation messages, the respective reliability status for the respective WAN interface. In at least some example embodiments, the path validation messages are sent to a server cluster downstream of a hybrid access gateway (HAG) serving the HCPE. In at least some example embodiments, the path validation messages comprise respective ping messages. In at least some example embodiments, performing the path monitoring test includes sending, by the HCPE via the respective WAN interface periodically according to an initial test schedule, path validation messages and monitoring, by the HCPE, for respective path validation responses to the respective path validation messages. In at least some example embodiments, the method includes activating, by the HCPE based on a determination that one of the path validation responses is not received, use of a second test schedule for the respective WAN interface, sending, by the HCPE via the respective WAN interface periodically according to the second test schedule, a set of path validation messages, and monitoring, by the HCPE, for a set of path validation responses for the set of path validation messages. In at least some example embodiments, the method includes activating, by the HCPE based on a determination that a threshold number of the path validation responses are received, use of the initial test schedule for the respective WAN interface. In at least some example embodiments, the method includes setting, by the HCPE based on a determination that a threshold number of the path validation responses are not received, the reliability status of the respective WAN interface to a value indicative that the respective WAN interface is included in the multipath interface group, but is experiencing degraded service and initiating, by the HCPE, an alarm related to reliability of the respective WAN interface. In at least some example embodiments, the method includes determining, by the HCPE based on a determination that a threshold number of the path validation responses are not received, whether the respective WAN interface is a default WAN interface for the multipath interface group and determining, by the HCPE based on whether the respective WAN interface is the default WAN interface for the multipath interface group, the respective reliability status for the respective WAN interface. In at least some example embodiments, the method includes setting, by the HCPE based on a determination that the respective WAN interface is not the default WAN interface for the multipath interface group, the reliability status of the respective WAN interface to a value indicative that the WAN interface is up, but that, due to a failure, has been removed from the multipath interface group and initiating, by the HCPE, an alarm related to reliability of the respective WAN interface. In at least some example embodiments, the method includes setting, by the HCPE based on a determination that the respective WAN interface is the default WAN interface for the multipath interface group, the reliability status of the respective WAN interface to a value indicative that the WAN interface is down, unavailable, or unreachable and initiating, by the HCPE, an alarm related to reliability of the respective WAN interface. In at least some example embodiments, controlling the multipath interface group for the multipath connection of the HCPE includes controlling, based on the respective reliability statuses of the respective WAN interfaces, maintenance of the multipath interface group for the multipath connection.

In at least some example embodiments, an apparatus includes means for determining, by a hybrid-access customer premises equipment (HCPE) supporting a set of wide area network (WAN) interfaces based on respective evaluations performed for the respective WAN interfaces, respective reliability statuses of the respective WAN interfaces and means for controlling, by the HCPE based on the respective reliability statuses of the respective WAN interfaces, a multipath interface group for a multipath connection of the HCPE. In at least some example embodiments, the reliability statuses for the respective WAN interfaces are assigned based on a set of reliability status values supported by the HCPE. In at least some example embodiments, the set of reliability status values supported by the HCPE includes a first value indicative that the WAN interface is up and operational, a second value indicative that the WAN interface is up, is operating correctly, has been tested, and is included in the multipath interface group, a third value indicative that the WAN interface is included in the multipath interface group, but is experiencing degraded service, a fourth value indicative that the WAN interface is up, but that, due to a failure, has been removed from the multipath interface group, and a fifth value indicative that the WAN interface is down, unavailable, or unreachable. In at least some example embodiments, the respective reliability statuses of the WAN interfaces are determined based on boot-up of the HCPE. In at least some example embodiments, based on a determination that a respective WAN interface of the set of WAN interfaces is a wired interface, the respective evaluation performed for the respective WAN interface includes a determination of a link status of a link associated with the respective WAN interface. In at least some example embodiments, based on a determination that the link status of the link associated with the respective WAN interface is indicative that the link is up, the reliability status is set to a value indicative that the WAN interface is up and operational. In at least some example embodiments, the apparatus includes means for initiating, by the HCPE, lower stack Internet Protocol (IP) configurations at the HCPE. In at least some example embodiments, based on a determination that the link status of the link associated with the respective WAN interface is indicative that the link is down, the reliability status is set to a value indicative that the respective WAN interface is down, unavailable, or unreachable. In at least some example embodiments, the apparatus includes means for preventing, by the HCPE, inclusion of the respective WAN interface in the multipath interface group for the multipath connection of the HCPE. In at least some example embodiments, the apparatus includes means for detecting, by the HCPE, that the link associated with the respective WAN interface has switched from being down to being up and means for initiating, by the HCPE after a wait time, readiness testing for the respective WAN interface. In at least some example embodiments, based on a determination that a respective WAN interface of the set of WAN interfaces is a wireless interface, the respective evaluation performed for the respective WAN interface includes a set of verification checks. In at least some example embodiments, the set of verification checks includes at least one of a check for verifying subscriber identification module (SIM) card readiness, a check for verifying network status, or a check for verifying packet data network (PDN) connection status. In at least some example embodiments, based on a determination that each of the verification checks associated with the respective WAN interface is successful, the reliability status is set to a value indicative that the WAN interface is up and operational. In at least some example embodiments, the apparatus includes means for initiating, by the HCPE, lower stack Internet Protocol (IP) configurations at the HCPE. In at least some example embodiments, based on a determination that at least one of the verification checks associated with the respective WAN interface is unsuccessful, the reliability status is set to a value indicative that that the WAN interface is down, unavailable, or unreachable. In at least some example embodiments, the apparatus includes means for preventing, by the HCPE, inclusion of the respective WAN interface in the multipath interface group for the multipath connection of the HCPE. In at least some example embodiments, the apparatus includes means for periodically re-executing the set of verification checks for the respective WAN interface until each of the verification checks in the set of verification checks is successful. In at least some example embodiments, the means for controlling the multipath interface group for the multipath connection of the HCPE includes means for controlling, based on the respective reliability statuses of the respective WAN interfaces, a membership of the multipath interface group for the multipath connection. In at least some example embodiments, for a respective WAN interface of the set of WAN interfaces, the respective evaluation performed for the respective WAN interface includes a path validation test configured to validate a network path associated with the respective WAN interface. In at least some example embodiments, the means for performing the path validation test includes means for sending, by the HCPE, a set of path validation messages via the respective WAN interface and means for determining, by the HCPE based on the set of path validation messages, the respective reliability status for the respective WAN interface. In at least some example embodiments, the path validation messages are sent to a server cluster downstream of a hybrid access gateway (HAG) serving the HCPE. In at least some example embodiments, the path validation messages comprise respective ping messages. In at least some example embodiments, the means for determining the respective reliability status for the respective WAN interface based on the set of path validation messages includes means for setting, based on a determination that a threshold number of the path validation messages are successfully received, the reliability status of the respective WAN interface to a value indicative that the respective WAN interface is up, is operating correctly, has been tested, and is included in the multipath interface group. In at least some example embodiments, the apparatus includes means for sending, by the HCPE, a path performance metrics message configured to support collection by the HCPE of path performance metrics for the respective network path associated with the respective WAN interface. In at least some example embodiments, the means for determining the respective reliability status for the respective WAN interface based on the set of path validation messages includes means for keeping, by the HCPE based on a determination that a threshold number of the path validation messages are not successfully received, the reliability status of the respective WAN interface set to a value indicative that the respective WAN interface is up and operational. In at least some example embodiments, the apparatus includes means for initiating, by the HCPE based on a determination that the respective path validation tests performed for the respective WAN interfaces are successful, activation of the multipath interface group. In at least some example embodiments, the apparatus includes means for initiating, by the HCPE, activation of the multipath interface group based on a determination that, for each of the WAN interfaces, the respective reliability status of the respective WAN interface is set to a value indicative that the respective WAN interface is up, is operating correctly, has been tested, and is included in the multipath interface group. In at least some example embodiments, the apparatus includes means for initiating, by the HCPE, activation of the multipath interface group and means for initiating, by the HCPE based on a multipath protocol of the multipath connection, a Hypertext Transfer Protocol (HTTP) speed test for the multipath connection. In at least some example embodiments, the means for controlling the multipath interface group for the multipath connection of the HCPE includes means for controlling, based on the respective reliability statuses of the respective WAN interfaces, establishment of the multipath interface group for the multipath connection. In at least some example embodiments, for a respective WAN interface of the set of WAN interfaces, the respective evaluation performed for the respective WAN interface includes a path monitoring test configured to monitor operation of a network path associated with the respective WAN interface. In at least some example embodiments, the means for performing the path monitoring test includes means for sending, by the HCPE, a set of path validation messages via the respective WAN interface and means for determining, by the HCPE based on the set of path validation messages, the respective reliability status for the respective WAN interface. In at least some example embodiments, the path validation messages are sent to a server cluster downstream of a hybrid access gateway (HAG) serving the HCPE. In at least some example embodiments, the path validation messages comprise respective ping messages. In at least some example embodiments, performing the path monitoring test includes sending, by the HCPE via the respective WAN interface periodically according to an initial test schedule, path validation messages and monitoring, by the HCPE, for respective path validation responses to the respective path validation messages. In at least some example embodiments, the apparatus includes means for activating, by the HCPE based on a determination that one of the path validation responses is not received, use of a second test schedule for the respective WAN interface, means for sending, by the HCPE via the respective WAN interface periodically according to the second test schedule, a set of path validation messages, and means for monitoring, by the HCPE, for a set of path validation responses for the set of path validation messages. In at least some example embodiments, the apparatus includes means for activating, by the HCPE based on a determination that a threshold number of the path validation responses are received, use of the initial test schedule for the respective WAN interface. In at least some example embodiments, the apparatus includes means for setting, by the HCPE based on a determination that a threshold number of the path validation responses are not received, the reliability status of the respective WAN interface to a value indicative that the respective WAN interface is included in the multipath interface group, but is experiencing degraded service and means for initiating, by the HCPE, an alarm related to reliability of the respective WAN interface. In at least some example embodiments, the apparatus includes means for determining, by the HCPE based on a determination that a threshold number of the path validation responses are not received, whether the respective WAN interface is a default WAN interface for the multipath interface group and means for determining, by the HCPE based on whether the respective WAN interface is the default WAN interface for the multipath interface group, the respective reliability status for the respective WAN interface. In at least some example embodiments, the apparatus includes means for setting, by the HCPE based on a determination that the respective WAN interface is not the default WAN interface for the multipath interface group, the reliability status of the respective WAN interface to a value indicative that the WAN interface is up, but that, due to a failure, has been removed from the multipath interface group and means for initiating, by the HCPE, an alarm related to reliability of the respective WAN interface. In at least some example embodiments, the apparatus includes means for setting, by the HCPE based on a determination that the respective WAN interface is the default WAN interface for the multipath interface group, the reliability status of the respective WAN interface to a value indicative that the WAN interface is down, unavailable, or unreachable and means for initiating, by the HCPE, an alarm related to reliability of the respective WAN interface. In at least some example embodiments, the means for controlling the multipath interface group for the multipath connection of the HCPE includes means for controlling, based on the respective reliability statuses of the respective WAN interfaces, maintenance of the multipath interface group for the multipath connection.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
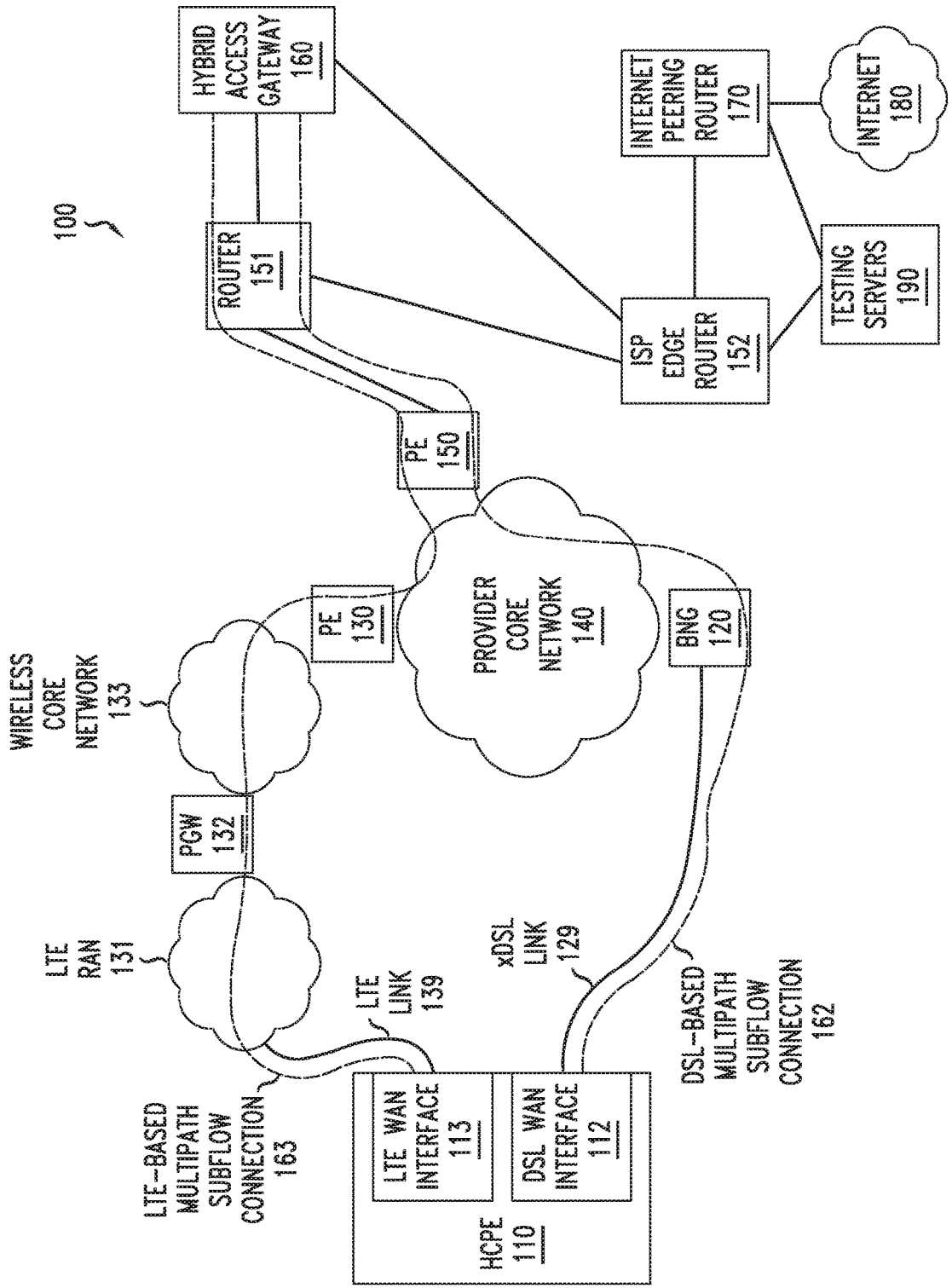
FIG. 1 depicts an example embodiment of a communication system configured to support network path reliability capabilities.

Various example embodiments for supporting network path reliability are presented. Various example embodiments for supporting network path reliability may be configured to support network path reliability for a set of network paths of an end user. Various example embodiments for supporting network path reliability may be configured to support network path reliability for a set of network paths associated to form a single logical connection for an end user. The set of network paths associated to form the single logical connection for the end user may be associated based on use of hybrid access technology (e.g., providing a logical connection between a hybrid-access customer premises equipment (HCPE) of the end user and a hybrid-access gateway (HAG) configured to serve the HCPE). The set of network paths associated to form the single logical connection for the end user may be associated based on use of multipath technology (e.g., Multipath Transmission Control Protocol (MPTCP) or other suitable multipath protocols or technologies) to aggregate multiple access network paths available to the end user into a single logical connection for the end user. The set of network paths associated to form a single logical connection for an end user may include wide area network (WAN) paths associated with various types of WANs via which the HCPE may be configured to communicate (e.g., using respective WAN interfaces at the HCPE), such as wired WANs (e.g., a digital subscriber line (DSL) access network, a Data Over Cable Service Interface Specification (DOCSIS) access network, a passive optical network (PON) access network, or the like, as well as various combinations thereof), wireless WANs (e.g., a cellular access network (e.g., Third Generation (3G) cellular access networks, a Fourth Generation (4G) cellular access network (e.g., a Long Term Evolution (LTE) access network), a Fifth Generation (5G) cellular access network, or the like), a fixed wireless access network, a WiFi access network, a satellite access network, or the like, as well as various combinations thereof), or the like, as well as various combinations thereof. In at least some example embodiments, support for network path reliability may include determining, by an HCPE supporting a set of WAN interfaces based on respective evaluations performed for the respective WAN interfaces, respective reliability statuses of the respective WAN interfaces and controlling, by the HCPE based on the respective reliability statuses of the respective WAN interfaces, a multipath interface group for a multipath connection of the HCPE where the multipath interface group for the multipath connection may be a group of WAN interfaces which may be associated (e.g., used, link, connected, mapped, bridged, or the like) to support traffic of the multipath connection. In at least some example embodiments, support for network path reliability may include supporting one or more network path testing types (e.g., network path reachability testing, network path performance testing, or the like, as well as various combinations thereof). In at least some example embodiments, support for network path reliability may include supporting one or more network path testing types (e.g., network path reachability testing, network path performance testing, or the like, as well as various combinations thereof) in hybrid access based on multipath technology. In at least some example embodiments, support for network path reliability may include supporting one or more network path testing types (e.g., network path reachability testing, network path performance testing, or the like, as well as various combinations thereof) based on use of a set of testing servers (e.g., ping servers, TR-143 servers, or the like, as well as various combinations thereof). It will be appreciated that these and various other example embodiments and advantages or potential advantages of supporting network path reliability may be further understood by way of reference to the various figures, which are discussed further below.

FIG. 1 depicts an example embodiment of a communication system configured to support network path reliability capabilities.

The communication system 100 is configured to support a hybrid access environment based on multipath technology using xDSL access and LTE access. It will be appreciated that, although primarily presented within the context of use of two specific types of access technologies for supporting hybrid access based on multipath technology (namely, xDSL and LTE), hybrid access based on multipath technology may be supported using various other numbers and types of access technologies (e.g., two or more of xDSL, DOCSIS, PON, 3G cellular, 4G cellular, 5G cellular, fixed wireless access, WiFi, satellite, or the like, as well as various combinations thereof).

The communication network 100 includes an HCPE 110 and a HAG 160 configured to support hybrid access based on multipath technology (e.g., MPTCP or other suitable types of multipath technology).

The HCPE 110 connects to a provider core network 140 via multiple access technologies including xDSL access and LTE access. For the xDSL access, the HCPE 110 connects to the provider core network 140 via a border network gateway (BNG) 120 using an xDLS link 112. For LTE access, the HCPE 110 connects to the provider core network 140 via a provider edge (PE) 130 using an LTE link 113 supported by a wireless network including an LTE RAN 131 and a mobile core network 133 interconnected via a Packet Data Network (PDN) gateway (PGW) 132. The mobile network core 133 may be an MPLS-based core or other suitable type of core network. The provider core network 140 supports access by the HCPE 110 to a hybrid access gateway (HAG) 160 via which the HCPE 110 may communicate with various other upstream elements (e.g., the Internet 180, testing servers 190, and so forth). The provider core network 140 may be an MPLS core or other suitable type of core network.

The HAG 160 connects to the provider core network 140 via a provider edge (PE) 150 associated with the provider core network 140 and a router 151 disposed between the PE 150 and the HAG 160. The PE 150 and the HAG 160 are each connected to an ISP edge router 152. The ISP edge router 152 is connected to an Internet Peering router 170 that provides access to the Internet 180. The ISP edge router 152 and the Internet Peering router 170 are each connected to the testing servers 190. The testing servers 190 may include ICMP servers configured to support ICMP ping testing, a cluster of TR-143 servers configured to support TR-143-based testing, or the like, as well as various combinations thereof. In this manner, the HAG 160 provides access by the HCPE 110 to the Internet 180 for communications via the Internet 180, provides access by the HCPE 110 to the testing servers 190 for supporting various types of network path reliability testing, or the like, as well as various combinations thereof.

The HCPE 110 and the HAG 160 communicate using hybrid access based on multipath technology. The HCPE 110 may support communications of a set of customer premises devices located at the customer premises with the HCPE 110 (e.g., smartphones, routers, televisions, Internet-of-Things (IoT) devices, or the like, as well as various combinations thereof), which have been omitted for purposes of clarity. The HCPE 110 includes a set of wide area network (WAN) interfaces 111, configured to support communications by the HCPE 110 with elements remote from the customer premises, including an xDSL WAN interface 111-D that is configured to support multipath-based communications with the HAG 160 via a multipath connection composed of an xDSL-based multipath subflow connection 162 (e.g., a TCP connection where MPTCP is used as the multipath technology) and an LTE WAN interface 111-L that is configured to support multipath-based communications with the HAG 160 via an LTE-based multipath subflow connection 163 (e.g., a TCP connection where MPTCP is used as the multipath technology). The xDSL-based multipath subflow connection 162 between the HCPE 110 and the HAG 160, as illustrated in FIG. 1, traverses the BNG 120, the service provider core 140 (e.g., using an access network VPN, or other suitable connection, between BNG 120 and PE 150), and the router 151. The LTE-based multipath subflow connection 163 between the HCPE 110 and the HAG 160, as illustrated in FIG. 1, traverses the wireless communication network, the service provider core 140 (e.g., using a hybrid access gateway VPN, or other suitable connection, between PE 130 and PE 150), and the router 151. It will be appreciated that the HCPE 110 may include fewer or more, as well as different, WAN interfaces configured to support hybrid access communications with HAG 160.

The HCPE 110, as indicated and discussed further herein, may be configured to support network path reliability capabilities.

In at least some example embodiments, the HCPE 110 may be configured to support network path reliability by supporting one or more network path testing types (e.g., network path reachability testing, network path performance testing, or the like, as well as various combinations thereof) for one or more network paths associated with one or more WAN interfaces 111 of the HCPE 110.

In at least some example embodiments, the HCPE 110 may be configured to support network path reliability by supporting network path testing for WAN interfaces 111 of the HCPE 110 in a manner for supporting control over membership, establishment, and maintenance of a multipath interface group at the HCPE 110 for a multipath connection of the HCPE 110. The multipath interface group at the HCPE 110 may be a set of WAN interfaces 111 of the HCPE 110. The multipath interface group at the HCPE 110 may be a set of WAN interfaces 111 of the HCPE 110 which may be associated together in a manner for supporting traffic of the multipath connection. The multipath interface group at the HCPE 110 may be a set of WAN interfaces 111 of the HCPE 110 which may be associated together in a manner for supporting traffic of the multipath connection using a set of subflow connections for the multipath connection, such as where each of the WAN interfaces 111 of the HCPE 110 that is part of the multipath interface group for the multipath connection of the HCPE supports a subflow connection for the multipath connection of the HCPE 110, respectively (e.g., such as a set of TCP subflow connections where the multipath connection for the HCPE is an MPTCP connection between the HCPE 110 and the HAG 160). The multipath interface group for the multipath connection of the HCPE 110 may be a set of WAN interfaces 111 of the HCPE 110 which may be associated together, in a manner configured to support traffic of the multipath connection of the HCPE 110, such that the WAN interfaces 111 of the HCPE 110 are linked, mapped, bridged, or the like. It will be appreciated that the "multipath interface group" also may be referred to herein as a "multipath bridge group" or using other similar terminology which may or may not vary based on the manner in which the WAN interfaces 111 of the HCPE 110 are associated to form the group of WAN interfaces 111 of the HCPE 110 for the multipath connection of the HCPE 110. In the example communication network 100 of FIG. 1, for example, the multipath interface group may include the DSL WAN interface 111-D and the LTE WAN interface 111-L of HCPE 110.

In at least some example embodiments, the HCPE 110 may be configured to support network path reliability by determining, for each of the WAN interfaces 111 of the HCPE based on respective evaluations performed for the respective WAN interfaces 111, respective reliability statuses for the respective WAN interfaces 111 and by controlling, based on the respective reliability statuses of the respective WAN interfaces 111, a multipath interface group for a multipath connection of the HCPE 110. An example embodiment of a corresponding method is presented with respect to FIG. 2.

In at least some example embodiments, the reliability statuses for the respective WAN interfaces 111 of the HCPE 110 may be assigned based on a set of reliability status values supported by the HCPE 110. In at least some example embodiments, the set of reliability status values supported by the HCPE 110 are supported using a reliability parameter (denoted herein as ReliabilityLevel, although it will be appreciated that other parameter names could be used) which may be associated with each of the WAN interfaces 111 of the HCPE 110. In at least some example embodiments, the set of reliability status values supported by the HCPE 110, for maintaining reliability levels for the WAN interfaces 111 of the HCPE 110, includes: (a) a first value indicative that the WAN interface 111 is up and operational (e.g., ReliabilityLevel=0, although it will be appreciated that other suitable values may be used), (b) a second value indicative that the WAN interface 111 is up, is operating correctly, has been tested, and is included in the multipath interface group (e.g., ReliabilityLevel=1, although it will be appreciated that other suitable values may be used), (c) a third value indicative that the WAN interface 111 is included in the multipath interface group, but is experiencing degraded service (e.g., ReliabilityLevel=2, although it will be appreciated that other suitable values may be used), (d) a fourth value indicative that the WAN interface 111 is up, but that, due to a failure, has been removed from the multipath interface group (e.g., ReliabilityLevel=3, although it will be appreciated that other suitable values may be used), and (e) a fifth value indicative that the WAN interface 111 is down, unavailable, or unreachable (e.g., ReliabilityLevel=4, although it will be appreciated that other suitable values may be used). It will be appreciated that different reliability level values may be used, fewer or more reliability levels may be supported, reliability levels may be defined in other ways, or the like, as well as various combinations thereof.

In at least some example embodiments, the HCPE 110 may be configured to determine the respective reliability statuses of the WAN interfaces 111 of the HCPE 110 based on boot-up of the HCPE 110 (e.g., boot-up based upon power up of the HCPE 110, boot-up responsive to restarting of the HCPE 110, or the like) and may control a multipath interface group for a multipath connection of the HCPE 110, based on the respective reliability statuses of the respective WAN interfaces 111 of the HCPE 110, by controlling membership of a multipath interface group for a multipath connection (e.g., enabling WAN interfaces 111 of the HCPE 110 that satisfy a particular reliability level, as indicated by the respective reliability statuses of the respective WAN interfaces 111, to be members of the multipath interface group). It will be appreciated that at least some such embodiments are presented with respect to FIGS. 2 and 3.

In at least some example embodiments, the HCPE 110 may be configured to determine the respective reliability statuses of the WAN interfaces 111 by performing, for the WAN interfaces 111, respective path validation tests configured to validate respective network paths associated with the respective WAN interfaces 111. The HCPE 110 may control a multipath interface group for a multipath connection of the HCPE 110, based on the respective reliability statuses of the respective WAN interfaces 111, by controlling establishment of multipath interface group for a multipath connection (e.g., controlling membership of the multipath interface group based on the respective reliability statuses of the respective WAN interfaces 111, initiating activation of the multipath interface group based on a determination that the multipath interface group includes network paths associated with WAN interfaces 111 of the HCPE 110 that satisfy a particular reliability level as indicated by the respective reliability statuses of the respective WAN interfaces 111, and so forth). This may be referred to herein as HCPE multipath readiness and path validation. It will be appreciated that at least some such embodiments are presented with respect to FIGS. 2 and 4.

In at least some example embodiments, the HCPE 110 may be configured to determine the respective reliability statuses of the WAN interfaces 111 of the HCPE 110 based on path monitoring tests configured to monitor operation of network paths associated with the respective WAN interfaces 111. The HCPE 110 may control a multipath interface group for a multipath connection of the HCPE 110, based on the respective reliability statuses of the respective WAN interfaces 111, by controlling maintenance of the multipath interface group for the multipath connection (e.g., maintenance activities such as maintaining or modifying membership of the multipath interface group, monitoring network paths of the multipath interface group, testing network paths of the multipath interface group, or the like, as well as various combinations thereof). This may be referred to herein as HCPE multipath path validation or HCPE multipath interface group maintenance. It will be appreciated that at least some such embodiments are presented with respect to FIGS. 2 and 5.

It will be appreciated that such embodiments for determining the respective reliability statuses of the WAN interfaces 111 of the HCPE 110 and controlling a multipath interface group for a multipath connection of the HCPE 110 based on the respective reliability statuses of the WAN interfaces 111 of the HCPE 110 may be used individually from each other (with or without being used in combination with other processes for multipath interface group management), in various combinations (with or without being used in combination with other processes for multipath interface group management), or the like, as well as various combinations thereof.

It will be appreciated that, although primarily presented herein within the context of supporting various embodiments of network path reliability capabilities within a particular type of communication system, various embodiments of network path reliability capabilities may be supported within various other communication systems.

Figure 2:
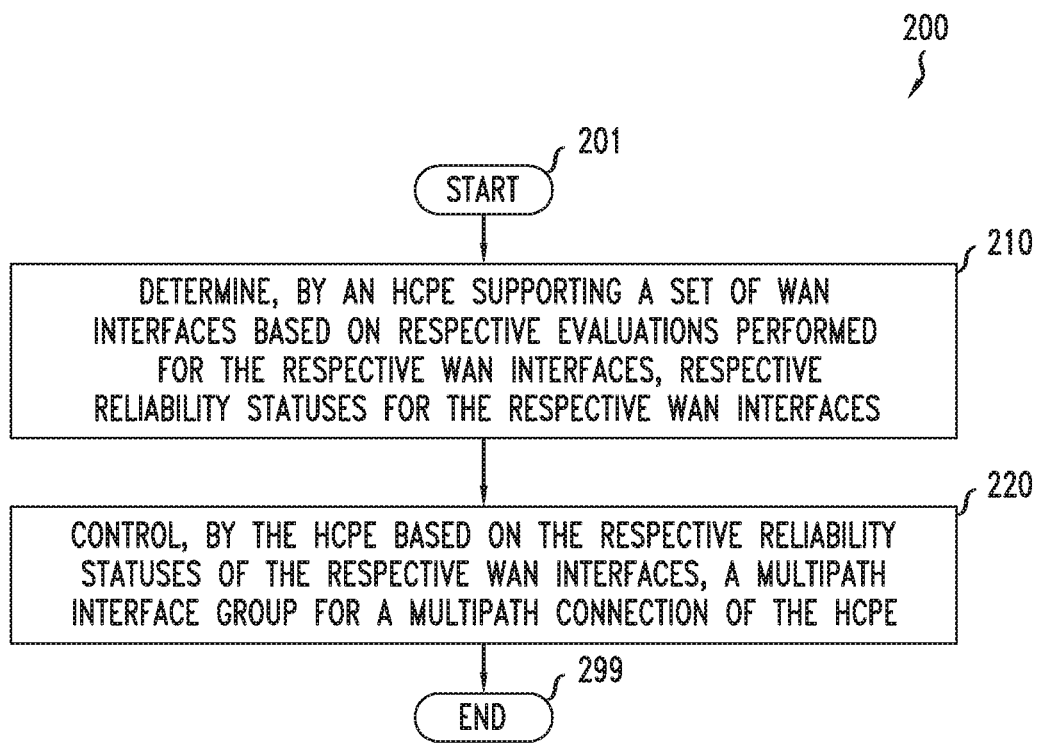
FIG. 2 depicts an example embodiment of a method for use by an HCPE to support network path reliability capabilities.

It will be appreciated that the operation of HCPE 110 of FIG. 1 in supporting network path reliability capabilities may be further understood by way of reference to FIG. 2.

FIG. 2 depicts an example embodiment of a method for use by an HCPE to support network path reliability capabilities. It will be appreciated that, although primarily presented as being performed serially, at least a portion of the functions of method 200 may be performed contemporaneously or in a different order than as presented with respect to FIG. 2. At block 201, method 200 begins. At block 210, determine, by an HCPE supporting a set of WAN interfaces based on respective evaluations performed for the respective WAN interfaces, respective reliability statuses of the respective WAN interfaces. It will be appreciated that the set of WAN interfaces that is considered may include some or all of the full set of WAN interfaces supported by the HCPE. At block 220, control, by the HCPE based on the respective reliability statuses of the respective WAN interfaces, a multipath interface group for a multipath connection of the HCPE. At block 299, method 200 ends. It will be appreciated that at least some such embodiments may be further understood by way of reference to FIGS. 3-5.

In at least some example embodiments (e.g., various example embodiments of FIG. 2), the HCPE may be configured to determine the respective reliability statuses of the WAN interfaces of the HCPE based on boot-up of the HCPE (e.g., boot-up based upon power up of the HCPE, boot-up responsive to restarting of the HCPE, or the like) and may control a multipath interface group for a multipath connection of the HCPE, based on the respective reliability statuses of the respective WAN interfaces, by controlling membership of a multipath interface group for a multipath connection. An example embodiment, as indicated above, is presented with respect to FIG. 3.

Figure 3:
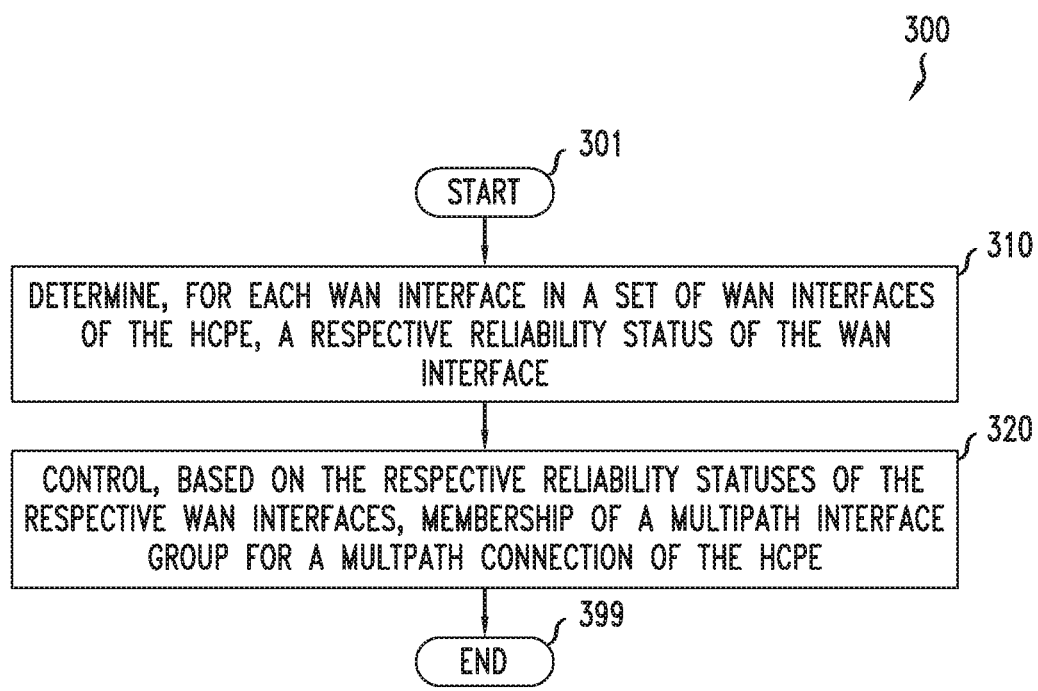
FIG. 3 depicts an example embodiment of a method for use by an HCPE to support network path reliability capabilities.

FIG. 3 depicts an example embodiment of a method for use by an HCPE to support network path reliability capabilities. It will be appreciated that, although primarily presented as being performed serially, at least a portion of the functions of method 300 may be performed contemporaneously or in a different order than as presented with respect to FIG. 3. At block 301, method 300 begins. At block 310, determine, for each WAN interface in a set of WAN interfaces of the HCPE, a respective reliability status of the WAN interface. It will be appreciated that the set of WAN interfaces that is considered may include some or all of the full set of WAN interfaces supported by the HCPE. At block 320, control, based on the respective reliability statuses of the respective WAN interfaces, membership of a multipath interface group for a multipath connection. At block 399, method 300 ends.

Various example embodiments which may be provided in conjunction with the method for use by the HCPE to support network path reliability capabilities (as presented in FIG. 3) are discussed further below.

In at least some example embodiments, the respective reliability statuses of the WAN interfaces are determined based on boot-up of the HCPE.

In at least some example embodiments, the manner in which the respective reliability statuses of the WAN interfaces are determined may be based on the WAN interface types of the WAN interfaces (e.g., wired versus wireless, varying across different types of wired WAN interfaces, varying across different types of wireless WAN interfaces, or the like, as well as various combinations thereof).

In at least some example embodiments, based on a determination that one of the WAN interfaces is a wired interface, the respective evaluation performed for the respective one of the WAN interfaces includes a determination of a link status of a link associated with the respective one of the WAN interfaces.

In at least some example embodiments, based on a determination that one of the WAN interfaces is a wired interface and based on a determination that the link status of the link associated with the respective one of the WAN interfaces is indicative that the link is up, the reliability status is set to a value indicative that the respective one of the WAN interfaces is up and operational. In at least some example embodiments, the HCPE may initiate lower stack Internet Protocol (IP) configurations for the respective one of the WAN interfaces at the HCPE.

In at least some example embodiments, based on a determination that one of the WAN interfaces is a wired interface and based on a determination that the link status of the link associated with the respective one of the WAN interfaces is indicative that the link is down, the reliability status is set to a value indicative that the respective one of the WAN interfaces is down, unavailable, or unreachable. In at least some example embodiments, the HCPE may prevent inclusion of the respective one of the WAN interfaces in the multipath interface group for the multipath connection of the HCPE. In at least some example embodiments, the HCPE may detect that the link associated with the respective one of the WAN interfaces has switched from being down to being up and initiate, after a wait time, readiness testing.

In at least some example embodiments, based on a determination that one of the WAN interfaces is a wireless interface, the respective evaluation performed for the respective one of the WAN interfaces includes a set of verification checks. The set of verification checks that is performed for a wireless WAN interface may depend on the WAN interface type of the wireless WAN interface (e.g., cellular versus WiFi, 4G versus 5G, and so forth).

In at least some example embodiments, based on a determination that one of the WAN interfaces is a wireless interface, the respective evaluation performed for the respective one of the WAN interfaces includes a set of verification checks where the set of verification checks includes at least one of a check for verifying subscriber identification module (SIM) card readiness, a check for verifying network status, or a check for verifying packet data network (PDN) connection status.

In at least some example embodiments, based on a determination that one of the WAN interfaces is a wireless interface and based on a determination that each of the verification checks associated with the respective one of the WAN interfaces is successful, the reliability status is set to a value indicative that the respective one of the WAN interfaces is up and operational. In at least some example embodiments, the HCPE may initiate lower stack Internet Protocol (IP) configurations for the respective one of the WAN interfaces at the HCPE.

In at least some example embodiments, based on a determination that one of the WAN interfaces is a wireless interface and based on a determination that at least one of the verification checks associated with the respective one of the WAN interfaces is unsuccessful, the reliability status is set to a value indicative that that the respective one of the WAN interfaces is down, unavailable, or unreachable. In at least some example embodiments, the HCPE may prevent inclusion of the respective one of the WAN interfaces in the multipath interface group for the multipath connection of the HCPE. In at least some embodiments, the HCPE may periodically re-execute the set of verification checks for the respective one of the WAN interfaces until each of the verification checks in the set of verification checks is successful.

It will be appreciated that various example embodiments presented above within the context of FIG. 3 may be further understood when considered within the context of an example embodiment in which the HCPE is implementing xDSL and LTE hybrid access.

In this xDSL/LTE hybrid access example, the HCPE performs WAN interface readiness testing for xDSL and LTE WAN interfaces of the HCPE which are potential WAN interfaces which may be added as members of a multipath interface group for a multipath connection of the HCPE.

In this xDSL/LTE hybrid access example, the HCPE, upon booting up, supports a software configuration variable (denoted herein as ReliabilityLevel) that is attached to each of the WAN interfaces. The default value of this software configuration variable on startup may be "null" (no value), and the software configuration variable may support five possible values once the process is initiated. The HCPE may be configured to wait a pseudo-random time between boot-up before proceeding to the path validation testing (e.g., of FIG. 4). The pseudo-random time may be a pseudo-random time anywhere between 0 and 3 seconds (or for any other suitable length of time, such as 5 seconds, 10 seconds, or the like). It will be appreciated that use of a pseudo-random time between boot-up, before proceeding to the path validation testing, may reduce or even prevent unintentional Denial-Of-Service attacks that might otherwise result when having a relatively large number of HCPSs (e.g., hundreds to thousands of HCPE) accessing the network.

In this xDSL/LTE hybrid access example, the HCPE may be configured such that the xDSL WAN connection is the default path for hybrid access. It is noted that, in many hybrid access implementations, the HCPE will have the concept of a "default" path or interface. This is typically the lowest-cost and preferred WAN connection on which the IP traffic is initiated. For example, in the case of an MPTCP bridge group failure, the traffic would default to this "default path" interface (unless the "default path" interface is unavailable, in which case the traffic would be redirected to the next-best available path). In order to support the notion of such a default path in the hybrid access context, the operating system and software implementation of the HCPE may be configured to support configuration or identification of a given WAN interface as the "default path" for the multipath interface group.

In this xDSL/LTE hybrid access example, for the xDSL WAN interface, the HCPE may be configured to verify physical link status of the port (link up or down). If the link is down, the xDSL WAN interface gets set to "ReliabilityLevel=4", the MPTCP bridge does not get created, and any IP-based traffic will go out the "default path" interface. If link is up, the xDSL WAN interface gets set to "ReliabilityLevel=0" and the HCPE will proceed with lower stack IP configurations (e.g., DHCP, PPPoE, static addressing, or the like, as well as various combinations thereof). When the physical link for the xDSL interface does come up when "ReliabilityLevel=4", a wait timer may be used (e.g., 3 minutes, 5 minutes, or any other suitable value, where such value may be configurable), before proceeding to the path validation testing (e.g., of FIG. 4), to mitigate or prevent link flapping conditions.

In this xDSL/LTE hybrid access example, for the LTE WAN interface, the HCPE performs a set of verification tests. The set of verification tests may include verifying SIM card readiness, verifying network status, and verifying PDN connection status. If all of the verification checks for the LTE WAN interface are completed successfully, the LTE WAN interface gets set to "ReliabilityLevel=0" and the HCPE will proceed with lower stack IP configurations (e.g., DHCP, PPPoE, static addressing, or the like, as well as various combinations thereof). If one or more of the verification checks for the LTE WAN interface is unsuccessful, the LTE WAN interface gets set to "ReliabilityLevel=4" and the MPTCP bridge does not get created. The LTE status and readiness check (e.g., the set of verification tests) for the LTE WAN interface may be repeated as long as the LTE WAN interface remains at "ReliabilityLevel=4". The LTE status and readiness check for the LTE WAN interface while the LTE WAN interface remains at "ReliabilityLevel=4" may be performed periodically (e.g., every 5 minutes, every 7 minutes, or the like), aperiodically (e.g., responsive to one or more conditions), or using combinations of such mechanisms. When the all of the verification checks for the LTE WAN interface are eventually completed successfully when "ReliabilityLevel=4", a wait timer may be used (e.g., 3 minutes, 5 minutes, or any other suitable value, where such value may be configurable), before proceeding to the path validation testing (e.g., of FIG. 4), to mitigate or prevent link flapping conditions.

It will be appreciated that, although primarily presented within the context of an example embodiment in which the HCPE is implementing xDSL and LTE hybrid access, various embodiments presented with respect to the xDSL and LTE hybrid access (e.g., in terms of the ReliabilityLevel values assigned, the validation tests performed, the configuration actions initiated based on the result of validation tests, or the like, as well as various combinations thereof) may be used or adapted for use in other hybrid access arrangements (e.g., DOCSIS and 5G; xDSL, WiFi, and LTE; and so forth).

It will be appreciated that various embodiments presented herein within the context of FIG. 3 may be applied in various other ways.

In at least some example embodiments (e.g., various example embodiments of FIG. 2), the HCPE may be configured to determine the respective reliability statuses of the WAN interfaces of the HCPE based on path validation tests configured to validate network paths associated with the respective WAN interfaces and may control a multipath interface group for a multipath connection of the HCPE, based on the respective reliability statuses of the respective WAN interfaces, by controlling establishment of the multipath interface group for the multipath connection (e.g., controlling membership of the multipath interface group based on the respective reliability statuses of the respective WAN interfaces, initiating activation of the multipath interface group based on a determination that the multipath interface group includes network paths associated with WAN interfaces of the HCPE that satisfy a particular reliability level as indicated by the respective reliability statuses of the respective WAN interfaces, and so forth). This may be referred to herein as HCPE MPTCP readiness and path validation or, more generally, as HCPE multipath readiness and path validation. An example embodiment, as indicated above, is presented with respect to FIG. 4.

Figure 4:
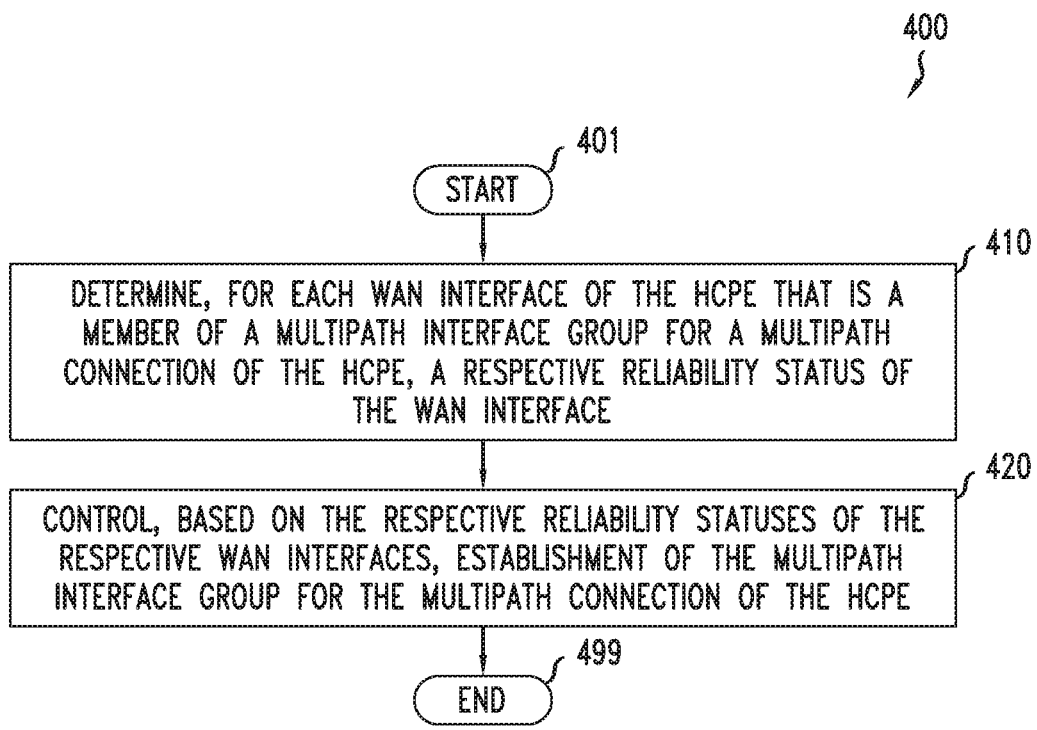
FIG. 4 depicts an example embodiment of a method for use by an HCPE to support network path reliability capabilities.

FIG. 4 depicts an example embodiment of a method for use by an HCPE to support network path reliability capabilities. It will be appreciated that, although primarily presented as being performed serially, at least a portion of the functions of method 400 may be performed contemporaneously or in a different order than as presented with respect to FIG. 4. At block 401, method 400 begins. At block 410, determine, for each WAN interface of the HCPE that is a member of a multipath interface group for a multipath connection of the HCPE, a respective reliability status of the WAN interface. At block 420, control, based on the respective reliability statuses of the respective WAN interfaces, establishment of the multipath interface group for the multipath connection. At block 499, method 400 ends.

Various example embodiments which may be provided in conjunction with the method for use by the HCPE to support network path reliability capabilities (as presented in FIG. 4) are discussed further below.

In at least some example embodiments, for at least one of the WAN interfaces, the respective evaluation performed for the respective WAN interface includes a path validation test configured to validate a network path associated with the respective WAN interface.

In at least some example embodiments, for one of the WAN interfaces for which the path validation test is performed, the path validation test includes sending, by the HCPE, a set of path validation messages via the respective one of the WAN interfaces and determining, by the HCPE based on the set of path validation messages, the respective reliability status for the respective one of the WAN interfaces. The path validation messages may be sent to a server cluster (e.g., a TR-143 server cluster) downstream of the HAG serving the HCPE. The path validation messages may be ping messages (e.g., ICMP ping messages or using other suitable types of ping messages) or other suitable types of messages.

In at least some example embodiments, to determine the respective reliability status for the respective WAN interface based on the set of path validation messages, the HCPE may set, based on a determination that a threshold number of the path validation messages are successfully received, the reliability status of the respective WAN interface to a value indicative that the respective WAN interface is up, is operating correctly, has been tested, and is included in the multipath interface group. In at least some example embodiments, the HCPE may send a path performance metrics message configured to support collection by the HCPE of path performance metrics for the respective network path associated with the respective WAN interface.

In at least some example embodiments, to determine the respective reliability status for the respective WAN interface based on the set of path validation messages, the HCPE may keep, based on a determination that a threshold number of the path validation messages are not successfully received, the reliability status of the respective WAN interface set to a value indicative that the respective WAN interface is up and operational.

In at least some example embodiments, the HCPE may initiate activation of the multipath interface group based on a determination that the respective path validation tests performed for the respective WAN interfaces are successful. In at least some example embodiments, after activation of the multipath interface group, the HCPE may initiate, based on a multipath protocol of the multipath connection, a Hypertext Transfer Protocol (HTTP) speed test for the multipath connection. The HCPE may log the results of such HTTP transfer/speed tests.

In at least some example embodiments, the HCPE may initiate activation of the multipath interface group based on a determination that, for each of the WAN interfaces, the respective reliability status of the respective WAN interface is set to a value indicative that the respective WAN interface is up, is operating correctly, has been tested, and is included in the multipath interface group. In at least some example embodiments, after activation of the multipath interface group, the HCPE may initiate, based on a multipath protocol of the multipath connection, a Hypertext Transfer Protocol (HTTP) speed test for the multipath connection. The HCPE may log the results of such HTTP transfer/speed tests.

It will be appreciated that various example embodiments presented above within the context of FIG. 4 may be further understood when considered within the context of an example embodiment in which the HCPE is implementing xDSL and LTE hybrid access.

In this xDSL/LTE hybrid access example, the HCPE performs HCPE multipath readiness and path validation for xDSL and LTE WAN interfaces which have been added as members of a multipath (MPTCP) bridge group for a multipath connection of the HCPE.

The HCPE may perform a set of ICMP ping tests for each of the WAN interfaces in the MPTPC bridge group at the HCPE. The HCPE may perform the set of ICMP tests for a WAN interface by performing five ICMP pings. The ICMP pings may be performed to the IP address of the TR143 cluster sitting downstream from the HAG in the network topology.

The HCPE, based on a determination that the set of ICMP tests for the WAN interface is successful (e.g., a minimum of 3 out of the 5 pings are successful), sets the WAN interface to "RehabilityLevel=1" such that the WAN interface is a part of the MPTCP bridge group. The HCPE, based on a determination that testing of the WAN interface is successful, may initiate a path performance metrics test for the path associated with the WAN interface (e.g., a test enabling the HCPE to gather path performance metrics indicative of the performance of the path associated with the WAN interface). The path performance metrics test may be a UDP Echo Plus test (e.g., the HCPE may send a "UDPEchoPlus" message (e.g., 128 bytes payload) to the TR-143 server cluster to gather more detailed path performance metrics. It will be appreciated that other types of performance metrics tests also or alternatively may be performed.

The HCPE, based on a determination that the set of ICMP tests for the WAN interface is unsuccessful (e.g., 3 or more of 5 ping tests are unsuccessful), sets the WAN interface to "RehabilityLevel=0" such that the WAN interface is not part of the MPTCP bridge group. The HCPE may then wait a cooldown time (e.g., 3 minutes, 5 minutes, or the like) and attempt to test the path associated with the WAN interface again. The HCPE may perform the test three times at a one minute interval. The HCPE, based on a determination that each of the three tests is successful, may set the WAN interface to "RehabilityLevel=1". The HCPE, based on a determination that one or more of the three tests is unsuccessful, may wait until the cooldown timer resets and then perform the tests again.

It will be appreciated that the set of ping tests for a WAN interface may include fewer or more pings, that the threshold number of successful or unsuccessful pings used for determining of the reliability level of the WAN interface may be lower or higher, that the length of the timer used for the cooldown time in the case in which set of ping tests is a failure may be lower or higher, or the like, as well as various combinations thereof.

The HCPE, if all desired interfaces for the MPTCP bridge group have a state of "RehabilityLevel=1", may activate the MPTCP bridge group to allow MPTCP subflows to be created to the HAG.

The HCPE, once the MPTCP bridge group is created and activated, may perform an HTTP transfer/speed test to the TR-143 server(s). The HTTP transfer/speed test to the TR-143 server(s) may be performed using MPTCP.

The HCPE may log various results from various tests performed by the HCPE for the multipath readiness and path validation. The results from the ICMP pings and other tests (e.g., the "UDPEchoPlus" tests, the HTTP transfer/speed tests, and so forth), may be captured (e.g., recorded, logged, pipped, or the like) to a file (e.g., NetworkBootupTesting). This file may be cycled once a day and compressed for saving historical information (e.g., for one week, one month, or thee like). It is noted that a maximum file(s) size restriction may be used for the file (e.g., to trigger an immediate compress and save or, if necessary, deletion of historical logging data) based on limited storage available on the HCPE.

It will be appreciated that, although primarily presented within the context of an example embodiment in which the HCPE is implementing xDSL and LTE hybrid access, various embodiments presented with respect to the xDSL and LTE hybrid access (e.g., in terms of the RehabilityLevel values assigned, the validation tests performed, the configuration actions initiated based on the result of validation tests, or the like, as well as various combinations thereof) may be used or adapted for use in other hybrid access arrangements (e.g., DOCSIS and 5G; xDSL, WiFi, and LTE; and so forth).

It will be appreciated that various embodiments presented herein within the context of FIG. 4 may be applied in various other ways.

In at least some example embodiments (e.g., various example embodiments of FIG. 2), the HCPE may be configured to determine the respective reliability statuses of the WAN interfaces of the HCPE based on path monitoring tests configured to monitor operation of network paths associated with the respective WAN interfaces and may control a multipath interface group for a multipath connection of the HCPE, based on the respective reliability statuses of the respective WAN interfaces, by controlling maintenance of the multipath interface group for the multipath connection (e.g., maintenance activities such as maintaining or modifying membership of the multipath interface group, monitoring network paths of the multipath interface group, testing network paths of the multipath interface group, or the like, as well as various combinations thereof). This may be referred to herein as HCPE MPTCP path validation or, more generally, as HCPE multipath path validation. An example embodiment, as indicated above, is presented with respect to FIG. 5.

Figure 5:
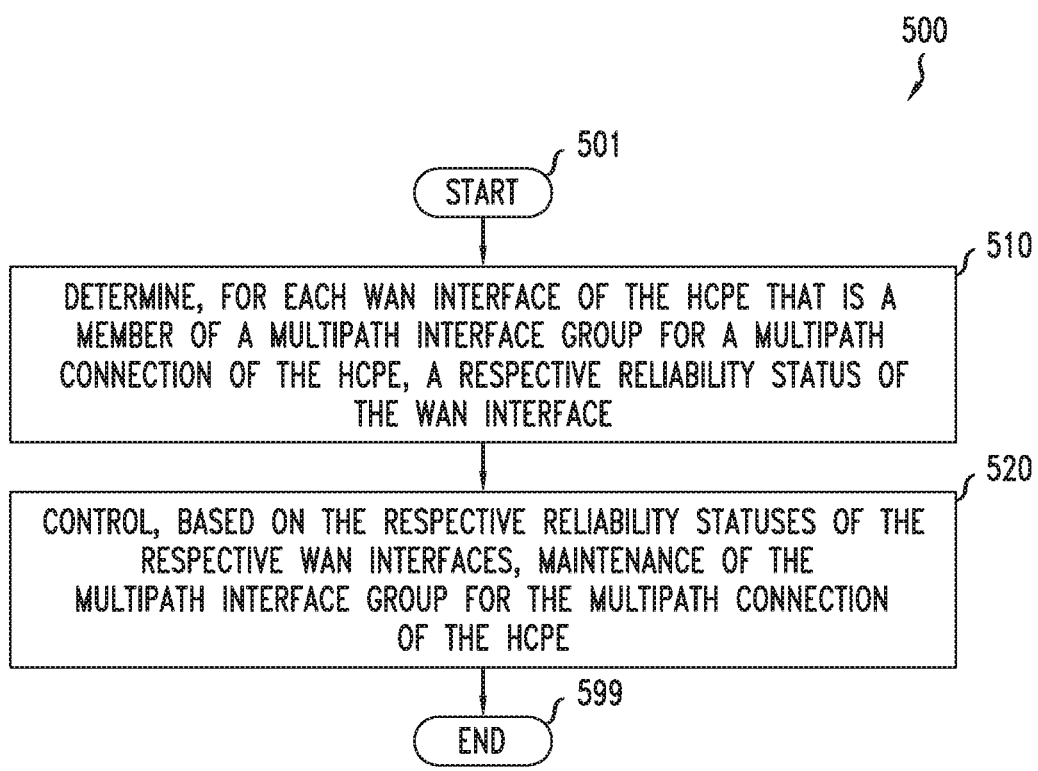
FIG. 5 depicts an example embodiment of a method for use by an HCPE to support network path reliability capabilities.

FIG. 5 depicts an example embodiment of a method for use by an HCPE to support network path reliability capabilities. It will be appreciated that, although primarily presented as being performed serially, at least a portion of the functions of method 500 may be performed contemporaneously or in a different order than as presented with respect to FIG. 5. At block 501, method 500 begins. At block 510, determine, for each WAN interface of the HCPE that is a member of a multipath interface group for a multipath connection of the HCPE, a respective reliability status of the WAN interface. At block 520, control, based on the respective reliability statuses of the respective WAN interfaces, maintenance of the multipath interface group for the multipath connection. At block 599, method 500 ends.

Various example embodiments which may be provided in conjunction with the method for use by the HCPE to support network path reliability capabilities (as presented in FIG. 5) are discussed further below.

In at least some example embodiments, for at least one of the WAN interfaces, the respective evaluation performed for the respective WAN interface includes a path monitoring test configured to monitor operation of a network path associated with the respective WAN interface.

In at least some example embodiments, to perform the path monitoring test, the HCPE may send a set of path validation messages via the respective WAN interface and determine, based on the set of path validation messages, the respective reliability status for the respective WAN interface. In at least some example embodiments, the path validation messages are sent to a server cluster downstream of HAG serving the HCPE. In at least some example embodiments, the path validation messages include respective ping messages.

In at least some example embodiments, to perform the path monitoring test, the HCPE may send path validation messages via the respective WAN interface periodically according to an initial test schedule and monitor for respective path validation responses to the respective path validation messages.

In at least some example embodiments, when the HCPE performs a path monitoring test by sending path validation messages via the respective WAN interface periodically according to the initial test schedule and monitoring for respective path validation responses to the respective path validation messages, the HCPE may perform additional processing based on the number of path validation responses received. In at least some example embodiments, the HCPE may activate, based on a determination that one of the path validation responses is not received, use of a second test schedule for the respective WAN interface, send, via the respective WAN interface periodically according to the second test schedule, a set of path validation messages and monitor for a set of path validation responses for the set of path validation messages.

In at least some example embodiments, when the HCPE performs a path monitoring test by sending path validation messages via the respective WAN interface periodically according to the initial test schedule and monitoring for respective path validation responses to the respective path validation messages, the HCPE may perform additional processing based on the number of path validation responses received. In at least some example embodiments, the HCPE may activate, based on a determination that a threshold number of the path validation responses are received, use of the initial test schedule for the respective WAN interface.

In at least some example embodiments, when the HCPE performs a path monitoring test by sending path validation messages via the respective WAN interface periodically according to the initial test schedule and monitoring for respective path validation responses to the respective path validation messages, the HCPE may perform additional processing based on the number of path validation responses received. In at least some example embodiments, the HCPE may set, based on a determination that a threshold number of the path validation responses are not received, the reliability status of the respective WAN interface to a value indicative that the respective WAN interface is included in the multipath interface group, but is experiencing degraded service and initiate, by the HCPE, an alarm related to reliability of the respective WAN interface.

In at least some example embodiments, when the HCPE performs a path monitoring test by sending path validation messages via the respective WAN interface periodically according to the initial test schedule and monitoring for respective path validation responses to the respective path validation messages, the HCPE may perform additional processing based on the number of path validation responses received. In at least some example embodiments, the HCPE may determine, based on a determination that a threshold number of the path validation responses are not received, whether the respective WAN interface is a default WAN interface for the multipath interface group and determine, based on whether the respective WAN interface is the default WAN interface for the multipath interface group, the respective reliability status for the respective WAN interface.

In at least some example embodiments, when the HCPE determines the respective reliability status for the respective WAN interface based on whether the respective WAN interface is the default WAN interface for the multipath interface group, the HCPE may set, based on a determination that the respective WAN interface is not the default WAN interface for the multipath interface group, the reliability status of the respective WAN interface to a value indicative that the WAN interface is up, but that, due to a failure, has been removed from the multipath interface group and initiate an alarm related to reliability of the respective WAN interface.

In at least some example embodiments, when the HCPE determines the respective reliability status for the respective WAN interface based on whether the respective WAN interface is the default WAN interface for the multipath interface group, the HCPE may set, by the HCPE based on a determination that the respective WAN interface is the default WAN interface for the multipath interface group, the reliability status of the respective WAN interface to a value indicative that the WAN interface is down, unavailable, or unreachable and initiate an alarm related to reliability of the respective WAN interface.

It will be appreciated that various example embodiments presented above within the context of FIG. 5 may be further understood when considered within the context of an example embodiment in which the HCPE is implementing xDSL and LTE hybrid access.

In this xDSL/LTE hybrid access example, the HCPE performs HCPE multipath path validation for xDSL and LTE WAN interfaces which are part of an active multipath (MPTCP) bridge group for a multipath connection of the HCPE.

The HCPE may perform an ICMP ping test for each of the WAN interfaces in the MPTPC bridge group at the HCPE. The HCPE may perform the ICMP test for a WAN interface by performing an ICMP ping. The ICMP ping may be performed to the IP address of the TR-143 cluster sitting downstream from the HAG in the network topology. The HCPE may perform the ICMP test for a WAN interface periodically (e.g., every 20 seconds, every 30 seconds, or the like).

The HCPE, for each of the ICMP pings performed for each of the WAN interfaces, monitors for an associated ICMP response. If an ICMP ping goes unanswered for a given interface, then the WAN interface gets put in aggressive ICMP polling mode, in which an ICMP ping retry is issued 3 seconds later, and repeated 10 times at a 2 second interval.

The HCPE, when in an aggressive polling mode for a WAN interfaces, monitors for the associated ICMP responses for the ICMP pings sent while in the aggressive polling mode.

The HCPE, based on a determination that 2 or less out of the 10 ICMP pings are not answered, may resume the regular ping schedule of 20 seconds.

The HCPE, based on a determination that 3 to 5 out of the 10 ICMP pings are not answered, may set the WAN interface to "ReliabilityLevel=2". The HCPE also may raise an alarm locally about the network reliability of the given WAN interface.

The HCPE, based on a determination that 6 or more of the 10 ICMP pings are not answered, may perform additional processing depending on whether the WAN interface is the "default path" WAN connection for the MPTCP bridge group.

The HCPE, based on a determination that the WAN interface is not the "default path" WAN connection, sets the WAN interface to "ReliabilityLevel=3". The HCPE also may raise an alarm about the network reliability of the given WAN interface and send the alarm to one or more other systems (e.g., via one or more northbound interfaces). The HCPE also may then remove the WAN interface from the MPTCP bridge group based on the setting of the WAN interface to "ReliabilityLevel=3".

The HCPE, based on a determination that the WAN interface is the "default path" WAN connection, sets the WAN interface to "ReliabilityLevel=3". The HCPE may disable the MPTCP bridge group. The HCPE also may raise an alarm about the network reliability of the given WAN interface and send the alarm to one or more other systems (e.g., via one or more northbound interfaces). The HCPE may direct traffic to the next best available path.

The HCPE, once one of the WAN interfaces is in "ReliabilityLevel=2", keeps the WAN interface in the aggressive ICMP polling mode until either the reachability Key Performance Indicators (KPIs) are satisfied for the WAN interface (e.g., 2 or less pings out of 10) or the WAN interface degrades to an unacceptable state (e.g., 6 or more ping failures out of 10).

The HCPE, once one of the WAN interfaces is in "ReliabilityLevel=3" may wait for a cooldown time (e.g., 3 minutes, 5 minutes, or the like) and then initiate HCPE multipath readiness and path validation testing (e.g., as presented with respect to FIG. 4). If successful, the HCPE will perform this test two more times (for a total of three iterations) at a 1 minute interval. The HCPE, based on a determination that all three iterations of the test are successful, may set the WAN interface to "ReliabilityLevel=1" such that the WAN interface is added back to the MPTCP bridge group. The HCPE, based on a determination that any of the three iterations fails, may re-initiate the cooldown time and the associated HCPE multipath readiness and path validation testing (e.g., as presented with respect to FIG. 4).

The HCPE may log various results from various tests performed by the HCPE for the multipath readiness and path validation. The results from the ICMP pings and other tests may be captured (e.g., recorded, logged, pipped, or the like) to a file (e.g., NetworkBootupTesting). This file may be cycled once a day and compressed for saving historical information (e.g., for one week, one month, or the like). It is noted that a maximum file(s) size restriction may be used for the file (e.g., to trigger an immediate compress and save or, if necessary, deletion of historical logging data) based on limited storage available on the HCPE.

The HCPE, while the MPTCP bridge group operational, may perform HTTP transfer/speed tests to the TR-143 server(s). The HTTP transfer/speed tests to the TR-143 server(s) may be performed periodically (e.g., once daily, twice daily, or the like). The HTTP transfer/speed tests to the TR-143 server(s) may be performed responsive to various conditions (e.g., during non-peak hours, based on a determination that network utilization is below a threshold (e.g., 50%, 20%, or the like), or the like, as well as various combinations thereof. The HTTP transfer/speed tests to the TR-143 server(s) may be performed using MPTCP. The HCPE may log the results of such HTTP transfer/speed tests.

It will be appreciated that, although primarily presented within the context of an example embodiment in which the HCPE is implementing xDSL and LTE hybrid access, various embodiments presented with respect to the xDSL and LTE hybrid access (e.g., in terms of the ReliabilityLevel values assigned, the validation tests performed, the configuration actions initiated based on the result of validation tests, or the like, as well as various combinations thereof) may be used or adapted for use in other hybrid access arrangements (e.g., DOCSIS and 5G; xDSL, WiFi, and LTE; and so forth).

It will be appreciated that various embodiments presented herein within the context of FIG. 5 may be applied in various other ways.

It will be appreciated that such embodiments for determining the respective reliability statuses of the WAN interfaces of the HCPE and controlling a multipath interface group for a multipath connection of the HCPE based on the respective reliability statuses of the WAN interfaces of the HCPE (e.g., as presented with respect to FIGS. 3-5) may be used individually from each other (with or without being used in combination with other processes for multipath interface group management), in various combinations (with or without being used in combination with other processes for multipath interface group management), or the like, as well as various combinations thereof.

In at least some example embodiments, as discussed further below, capabilities that prevent or at least tend to prevent saturation of the wireless access network when a wireless connection is used within the context of hybrid access may be provided.

In many cases, under normal operating conditions, the wireless connection (e.g., 4G/LTE, 5G, or the like) of a multipath interface group will be associated with an access provider network (APN) that has a QoS Class Identifier (QCI) that is better than best-effort (e.g., a value of 4-7, although it will be appreciated that this range is arbitrary and dependent on the specific localized capabilities of the RAN network). In the context of hybrid access using a wireless connection such as a 4G/LTE WAN connection, when the lowest-cost "default path" WAN connection (e.g., xDSL, DOCSIS, or the like) becomes unavailable, the traffic is diverted on the 4G/LTE WAN connection. In at least some example embodiments, in order to prevent saturation of the RAN when the traffic is switched to the 4G/LTE WAN connection, the multipath connection of the HCPE may be switched to an APN having a CQI associated with a lower level of service (e.g., a backup APN with a QCI value of "9" (best-effort service)). The switch to the APN having the lower level of service may be initiated by the HCPE, may be initiated by a network device (e.g., by an operator device of the RAN or a device in a core network associated with the RAN), or the like. The switch to the APN having the lower level of service may be achieved by perform an APN disconnect and reconnect to a different APN with the appropriate QCI considerations. The switch may be performed immediately or may be performed after a wait period (e.g., 3 minutes, 5 minutes, or the like) in order to prevent wireless signaling storms in cases where the fixed access facilities are unstable and flapping. The reconnection to the default APN can be performed in a similar manner when the default WAN connection has been restored and determined to be stable for a particular period of time (e.g., 3 minutes, 5 minutes, or the like). An example embodiment for switching an APN of a wireless WAN connection of a multipath connection is presented with respect to FIG. 6. It will be appreciated that support for such embodiments may provide various advantages and potential advantages for the service provider, such as remote diagnostics and reachability (e.g., TR-69) management of a device over multiple independent WAN connections, mitigation of a complete failure or outage (albeit at the cost of a lower-quality service), self-healing capabilities, or the like, as well as various combinations thereof.

Figure 6:
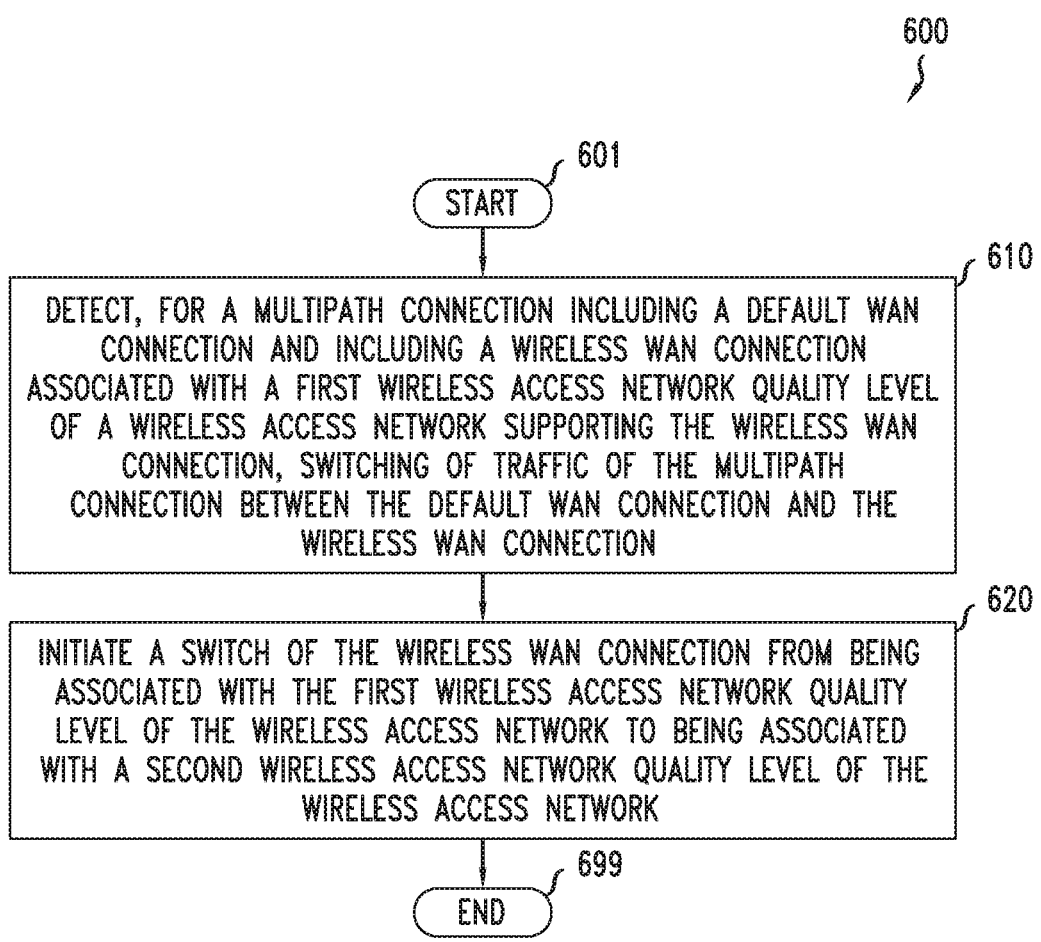
FIG. 6 depicts an example embodiment of a method for switching a wireless access network quality level of a wireless connection of a multipath connection in a hybrid access context.

FIG. 6 depicts an example embodiment of a method for switching a wireless access network quality level of a wireless connection of a multipath connection in a hybrid access context. It will be appreciated that, although primarily presented as being performed serially, at least a portion of the functions of method 600 may be performed contemporaneously or in a different order than as presented with respect to FIG. 6. At block 601, method 600 begins. At block 610, detect, for a multipath connection including a default WAN connection and including a wireless WAN connection associated with a first wireless access network quality level of a wireless access network supporting the wireless WAN connection, switching of traffic of the multipath connection between the default WAN connection and the wireless WAN connection. At block 620, initiate a switch of the wireless WAN connection from being associated with the first wireless access network quality level of the wireless access network to being associated with a second wireless access network quality level of the wireless access network. At block 699, method 600 ends. It is noted that, where traffic is switched from the default WAN connection to the wireless WAN connection (e.g., if the default WAN connection becomes unavailable), the switch of the wireless WAN connection from being associated with the first wireless access network quality level of the wireless access network to being associated with the second wireless access network quality level of the wireless access network may be a switch from a higher quality level (e.g., an APN having a QCI better than best-effort service) to a lower quality level (e.g., an APN having a QCI associated with a best-effort service). It is noted that, where traffic is switched from the wireless WAN connection to the default WAN connection (e.g., after recovery of the default WAN connection when the default WAN connection was unavailable), the switch of the wireless WAN connection from being associated with the first wireless access network quality level of the wireless access network to being associated with the second wireless access network quality level of the wireless access network may be a switch from a lower quality level (e.g., an APN having a QCI associated with a best-effort service) to a higher quality level (e.g., an APN having a QCI better than best-effort service).

It will be appreciated that various other capabilities that prevent or at least tend to prevent saturation of the wireless access network when a wireless connection is used within the context of hybrid access may be provided.

Various example embodiments for supporting network path reliability for a multipath connection supported by a multipath interface group in a hybrid access context may provide various advantages or potential advantages. For example, various example embodiments for supporting network path reliability for a multipath connection supported by a multipath interface group in a hybrid access context may provide finer granularity of control in managing the multipath interface group for the multipath connection and, thus, providing improved reliability and throughput for the multipath connection. Various example embodiments for supporting network path reliability for a multipath connection supported by a multipath interface group in a hybrid access context may provide various other advantages or potential advantages.

It will be appreciated that, although primarily presented herein with respect to various embodiments in which network path reliability is provided for a multipath connection supported by a multipath interface group in a hybrid access context, various embodiments presented herein may be used or adapted for use to provide network path reliability for a multipath connection supported by a multipath interface group in other types of contexts (e.g., other multipath contexts other than hybrid access networks).

It will be appreciated that, although primarily presented herein with respect to various embodiments in which network path reliability is provided for a multipath connection supported by a multipath interface group using underlying WAN connections to provide the multipath connection, various embodiments presented herein may be used or adapted for use to provide network path reliability for a multipath connection supported by a multipath interface group using various types of underlying connections to provide the multipath connection (e.g., a set of connections including a combination of one or more WAN connections and one or more other types of connections, a set of connections including one or more other types of connections, or the like).

Figure 7:
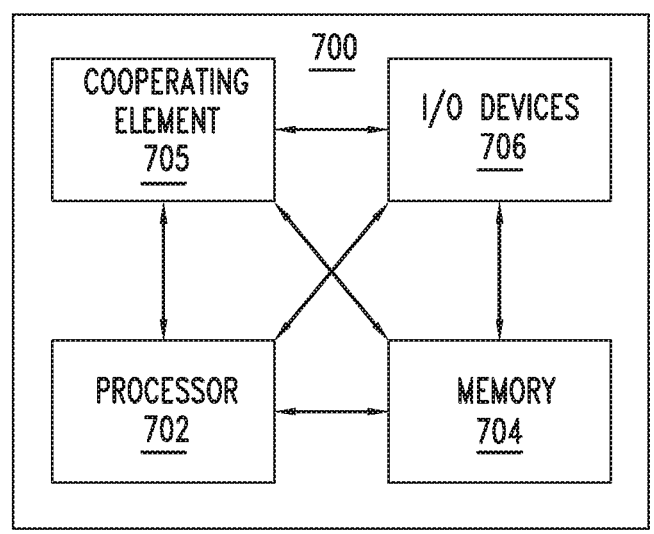
FIG. 7 depicts an example embodiment of a computer suitable for use in performing various functions presented herein.

FIG. 7 depicts an example embodiment of a computer suitable for use in performing various functions described herein.

The computer 700 includes a processor 702 (e.g., a central processing unit, a processor having a set of processor cores, a processor core of a processor, or the like) and a memory 704 (e.g., a random access memory, a read only memory, or the like). The processor 702 and the memory 704 may be communicatively connected. In at least some embodiments, the computer 700 may include at least one processor and at least one memory including program code, wherein the at least one memory and the program code are configured to, with the at least one processor, cause the computer to perform various functions presented herein.

The computer 700 also may include a cooperating element 705. The cooperating element 705 may be a hardware device. The cooperating element 705 may be a process that can be loaded into the memory 704 and executed by the processor 702 to implement functions as discussed herein (in which case, for example, the cooperating element 705 (including associated data structures) can be stored on a non-transitory computer-readable storage medium, such as a storage device or other storage element (e.g., a magnetic drive, an optical drive, or the like)).

The computer 700 also may include one or more input/output devices 706. The input/output devices 706 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 700 may represent a general architecture and functionality suitable for implementing functional elements described herein, portions of functional elements described herein, or the like, as well as various combinations thereof. For example, computer 700 may provide a general architecture and functionality that is suitable for implementing one or more elements presented herein, such as an HCPE or portion thereof, a HAG or portion thereof, a testing server or portion thereof, or the like, as well as various combinations thereof.

It will be appreciated that at least some of the functions presented herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits, and/or any other hardware equivalents).

It will be appreciated that at least some of the functions presented herein may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
   at least one processor; and
   at least one memory including program code;
   wherein the at least one memory and the program code are configured to, with the at least one processor, cause the apparatus to at least:
      determine, by a hybrid-access customer premises equipment (HCPE) supporting a set of wide area network (WAN) interfaces based on respective sets of evaluations performed for the respective WAN interfaces, respective reliability statuses of the respective WAN interfaces, wherein the respective sets of evaluations include a respective WAN interface verification test configured to determine a readiness of the respective WAN interface and a respective path validation test configured to validate a network path associated with the respective WAN interface; and
      control, by the HCPE based on the respective reliability statuses of the respective WAN interfaces, establishment of a multipath interface group for a multipath connection of the HCPE.

2. The apparatus of claim 1, wherein the reliability statuses for the respective WAN interfaces are assigned based on a set of reliability status values supported by the HCPE.

3. The apparatus of claim 2, wherein the set of reliability status values supported by the HCPE includes:
   a first value indicative that the WAN interface is up and operational;

a second value indicative that the WAN interface is up, is operating correctly, has been tested, and is included in the multipath interface group;
a third value indicative that the WAN interface is included in the multipath interface group, but is experiencing degraded service;
a fourth value indicative that the WAN interface is up, but that, due to a failure, has been removed from the multipath interface group; and
a fifth value indicative that the WAN interface is down, unavailable, or unreachable.

4. The apparatus of claim 1, wherein the respective reliability statuses of the WAN interfaces are determined based on boot-up of the HCPE.

5. The apparatus of claim 1, wherein, based on a determination that a respective WAN interface of the set of WAN interfaces is a wired interface, the respective WAN interface verification test performed for the respective WAN interface includes a determination of a link status of a link associated with the respective WAN interface.

6. The apparatus of claim 5, wherein, based on a determination that the link status of the link associated with the respective WAN interface is indicative that the link is up, the respective reliability status is set to a value indicative that the respective WAN interface is up and operational.

7. The apparatus of claim 5, wherein, based on a determination that the link status of the link associated with the respective WAN interface is indicative that the link is down, the respective reliability status is set to a value indicative that the respective WAN interface is down, unavailable, or unreachable.

8. The apparatus of claim 7, wherein the at least one memory and the program code are configured to, with the at least one processor, cause the apparatus to at least:
prevent, by the HCPE, inclusion of the respective WAN interface in the multipath interface group for the multipath connection of the HCPE.

9. The apparatus of claim 1, wherein, based on a determination that a respective WAN interface of the set of WAN interfaces is a wireless interface, the respective WAN interface verification test performed for the respective WAN interface includes a set of verification checks.

10. The apparatus of claim 9, wherein the set of verification checks includes at least one of a check for verifying subscriber identification module (SIM) card readiness, a check for verifying network status, or a check for verifying packet data network (PDN) connection status.

11. The apparatus of claim 9, wherein, based on a determination that each of the verification checks associated with the respective WAN interface is successful, the reliability status is set to a value indicative that the respective WAN interface is up and operational.

12. The apparatus of claim 9, wherein, based on a determination that at least one of the verification checks associated with the respective WAN interface is unsuccessful, the reliability status is set to a value indicative that the respective WAN interface is down, unavailable, or unreachable.

13. The apparatus of claim 1, wherein, to control the establishment of the multipath interface group for the multipath connection of the HCPE, the at least one memory and the program code are configured to, with the at least one processor, cause the apparatus to at least:
control, based on the respective reliability statuses of the respective WAN interfaces, a membership of the multipath interface group for the multipath connection.

14. The apparatus of claim 1, wherein, to perform the respective path validation test, the at least one memory and the program code are configured to, with the at least one processor, cause the apparatus to at least:
send, by the HCPE, a set of path validation messages via the respective WAN interface; and
determine, by the HCPE based on the set of path validation messages, the respective reliability status for the respective WAN interface.

15. The apparatus of claim 1, wherein the at least one memory and the program code are configured to, with the at least one processor, cause the apparatus to at least:
initiate, by the HCPE based on a determination that the respective path validation tests performed for the respective WAN interfaces are successful, activation of the multipath interface group.

16. The apparatus of claim 1, wherein the at least one memory and the program code are configured to, with the at least one processor, cause the apparatus to at least:
initiate, by the HCPE, activation of the multipath interface group based on a determination that, for each of the WAN interfaces, the respective reliability status of the respective WAN interface is set to a value indicative that the respective WAN interface is up, is operating correctly, has been tested, and is included in the multipath interface group.

17. The apparatus of claim 1, wherein, to control the establishment of the multipath interface group for the multipath connection of the HCPE, the at least one memory and the program code are configured to, with the at least one processor, cause the apparatus to at least:
control, based on the respective reliability statuses of the respective WAN interfaces, activation of the multipath interface group for the multipath connection.

18. The apparatus of claim 1, wherein the respective sets of evaluations include a respective path monitoring test configured to monitor operation of a respective network path associated with the respective WAN interface.

19. The apparatus of claim 18, wherein, to perform the respective path monitoring test, the at least one memory and the program code are configured to, with the at least one processor, cause the apparatus to at least:
send, by the HCPE, a set of path validation messages via the respective WAN interface; and
determine, by the HCPE based on the set of path validation messages, the respective reliability status for the respective WAN interface.

20. The apparatus of claim 18, wherein, to perform the respective path monitoring test, the at least one memory and the program code are configured to, with the at least one processor, cause the apparatus to at least:
send, by the HCPE via the respective WAN interface periodically according to an initial test schedule, path validation messages; and
monitor, by the HCPE, for respective path validation responses to the respective path validation messages.

21. The apparatus of claim 20, wherein the at least one memory and the program code are configured to, with the at least one processor, cause the apparatus to at least:
activate, by the HCPE based on a determination that one of the path validation responses is not received, use of a second test schedule for the respective WAN interface;
send, by the HCPE via the respective WAN interface periodically according to the second test schedule, a set of path validation messages; and monitor, by the HCPE, for a set of path validation responses for the set of path validation messages.

22. The apparatus of claim 1, wherein the at least one memory and the program code are configured to, with the at least one processor, cause the apparatus to at least:
control, based on the respective reliability statuses of the respective WAN interfaces, maintenance of the multipath interface group for the multipath connection.

23. An apparatus, comprising:
at least one processor; and
at least one memory including program code;
wherein the at least one memory and the program code are configured to, with the at least one processor, cause the apparatus to at least:
determine, by a hybrid-access customer premises equipment (HCPE) supporting a set of wide area network (WAN) interfaces based on respective evaluations performed for the respective WAN interfaces, respective reliability statuses of the respective WAN interfaces;
control, by the HCPE based on a determination that the respective reliability statuses of the respective WAN interfaces are indicative that the WAN interfaces have a first level of reliability, establishment of a multipath interface group for a multipath connection of the HCPE; and
control, by the HCPE based on a determination that the respective reliability statuses of the respective WAN interfaces are indicative that the WAN interfaces have a second level of reliability, activation of the multipath interface group for the multipath connection of the HCPE.

24. An apparatus, comprising:
at least one processor; and
at least one memory including program code;
wherein the at least one memory and the program code are configured to, with the at least one processor, cause the apparatus to at least:
maintain, by a hybrid-access customer premises equipment (HCPE) for a wide area network (WAN) interface of the HCPE, a reliability parameter;
set the reliability parameter to a first value based on a result of a WAN interface verification test for testing the WAN interface;
add the WAN interface to a multipath interface group based on a determination that the reliability parameter is set to the first value;
set the reliability parameter to a second value based on a result of a path validation test for testing a network path associated with the WAN interface; and
activate the multipath interface group based on a determination that the reliability parameter is set to the second value.

* * * * *